United States Patent
Kurokawa et al.

(10) Patent No.: US 6,183,868 B1
(45) Date of Patent: Feb. 6, 2001

(54) SPINDLE-SHAPED GOETHITE PARTICLES, SPINDLE-SHAPED HEMATITE PARTICLES AND SPINDLE-SHAPED MAGNETIC IRON BASED ALLOY PARTICLES

(75) Inventors: Haruki Kurokawa, Hiroshima; Kohji Mori, Onoda, both of (JP)

(73) Assignee: Toda Kogyo Corporation, Hiroshima-ken (JP)

( * ) Notice: Under 35 U.S.C. 154(b), the term of this patent shall be extended for 0 days.

(21) Appl. No.: 09/394,407

(22) Filed: Sep. 13, 1999

Related U.S. Application Data

(62) Division of application No. 08/847,481, filed on Apr. 25, 1997, now Pat. No. 6,048,412.

(30) Foreign Application Priority Data

Apr. 26, 1996 (JP) .................................... 8-130918

(51) Int. Cl.$^7$ ....................................... B32B 5/16
(52) U.S. Cl. ................. 428/403; 148/301; 148/311; 420/80; 420/83; 428/694 BA
(58) Field of Search .................. 428/403, 323, 428/694 BA; 148/301, 311; 420/80, 83

(56) References Cited

U.S. PATENT DOCUMENTS

| | | | |
|---|---|---|---|
| 5,137,783 | * 8/1992 | Tanihara et al. | 428/407 |
| 5,156,922 | 10/1992 | Mishima et al. | 428/570 |
| 5,399,278 | 3/1995 | Yamashita et al. | 252/62.56 |
| 5,466,306 | 11/1995 | Mishima et al. | 148/306 |
| 5,580,399 | 12/1996 | Tamai et al. | 148/301 |
| 5,591,535 | 1/1997 | Hisano et al. | 428/694 RE |
| 5,645,652 | 7/1997 | Okinaka et al. | 148/307 |
| 5,735,969 | * 4/1998 | Lown et al. | 148/105 |
| 5,750,250 | * 5/1998 | Hayashi et al. | 428/328 |
| 5,989,516 | * 11/1999 | Okinaka et al. | 423/632 |

\* cited by examiner

*Primary Examiner*—H. Thi Le
(74) *Attorney, Agent, or Firm*—Nixon & Vanderhye

(57) ABSTRACT

The present invention relates to spindle-shaped goethite particles and spindle-shaped hematite particles, which have a narrow particle size distribution, include no dendrites, and have an appropriate particle shape and a large aspect ratio (major axial diameter/minor axial diameter); and spindle-shaped magnetic iron based alloy particles which are obtained from the spindle-shaped goethite particle or spindle-shaped hematite particles as a beginning material and which have a high coercive force and an excellent coercive force distribution. Such spindle-shaped goethite particles comprises: goethite seed containing 0.5 to 25 atm % of Co based on the total Fe in the spindle-shaped goethite particles, and goethite surface layer containing 0.5 to 15 atm % of Al based on the total Fe in the spindle-shaped goethite particles; and having an average major axial diameter of 0.05 to 1.0 μm.

13 Claims, 6 Drawing Sheets

(X30000)

(X 30000)

(X 30000)

(X 30000)

(X 30000)

(X 30000)

(X 30000)

(X30000)

(X30000)

(×30000)

(×30000)

SPINDLE-SHAPED GOETHITE PARTICLES, SPINDLE-SHAPED HEMATITE PARTICLES AND SPINDLE-SHAPED MAGNETIC IRON BASED ALLOY PARTICLES

This is a division of application Ser. No. 08/847,481, filed Apr. 25, 1997, now U.S. Pat. No. 6,048,412 issue Apr. 11, 2000, the entire content of which is hereby incorporated by reference in this application.

BACKGROUND OF THE INVENTION

The present invention relates to spindle-shape goethite particles and a process for producing the same, spindle-shaped hematite particles and a process for producing the same, and spindle-shaped magnetic iron based alloy particles and a process for producing the same. More particularly, the present invention relates co spindle-shaped goethite particles and spindle-shaped hematite particles, which have a narrow particle size distribution, include no dendrites, and have an appropriate particle shape and a large aspect ratio (major axial diameter/minor axial diameter), to spindle-shaped magnetic iron based alloy particles which are obtained from the spindle-shaped goethite particle or spindle-shaped hematite particles as precursor particles and which have a high coercive force and an excellent coercive force distribution, and to a process for producing the shame.

Miniaturized and lightweight video or audio magnetic recording and play-back apparatuses for long-time recording have recently shown a remarkable progress. Especially, video tape recorders (VTR) have rapidly spread wide and more miniaturized and lighter-weight VTR's for longer-time recording have been developed rapidly. With this development, magnetic recording media such as a magnetic tape have been strongly required to have a higher performance and a higher recording density.

In other words, magnetic recording media are required to have a higher picture quality and higher output characteristics, in particular, to improve the frequency response. For this purpose, it is necessary to improve the residual flux density (Br), the coercive force, the dispersibility, the packing property and the surface smoothness of the magnetic media, i.e., to improve the S/N ratio of the magnetic media.

These properties of magnetic recording media strongly depend on the magnetic particles used in the magnetic recording media. In recent years, magnetic iron based alloy particles have attracted attention due to their higher coercive force and higher saturation magnetization than those of conventional iron oxide magnetic particles, and have been put to practical use as magnetic media such as digital audio tapes (DAT), 8-mm video tapes, Hi-8 tapes and video floppies. Such magnetic iron based alloy particles, however, are also strongly required improvement of the properties.

The relationship between various properties of magnetic recording media and magnetic particles used therefor is described in the following.

In order to obtain a high picture quality, magnetic recording media for VTR's are required to improve (1) a video S/N ratio, (2) a chroma S/N ratio and (3) a video frequency response, as is obvious from the description in NIKKEI ELECTRONICS, May 3, pp. 82 to 105 (1976).

In order to improve the video S/N ratio and the chroma S/N ratio, it is important to improve the dispersibility of the magnetic particles in a vehicle, the orientation property and the packing property of the magnetic particles in a coating film, and the surface smoothness of the magnetic recording media. Such magnetic particles are required to have a narrow particle size distribution, to include no dendrites and, in addition, to have appropriate particle shape and aspect ratio.

In order to improve the video frequency response, it is necessary that the magnetic recording medium has high coercive force Hc and residual flux density Br. In order to enhance the coercive force Hc of the magnetic medium, magnetic particles are required to have as high a coercive force as possible. Since the coercive force of magnetic particles is generally dependent upon the shape anisotropy, the coercive force has a tendency to increment with the increase in the aspect ratio of the magnetic particles.

For increasing the output characteristics, Japanese Patent Application Laid-Open (KOKAI) No. 63-26821 (1988) describes: "FIG. 1 shows the relationship between the S.F.D. and the recording and play-back output of the magnetic disk . . . . The relationship between the S.F.D. and the recording and play-back output is linear, as is seen from FIG. 1, which proves that the use of ferromagnetic particles having a small S.F.D. value enhances the recording and play-back output. That is, in order to increase the recording and play-back output, the S.F.D. should be as small as possible. In order to obtain a higher output than the ordinary one, it is necessary that the S.F.D. is not more than 0.6." As is clear from the above descriptions, it is necessary that the S.F.D. (Switching Field Distribution), i.e., the coercive force distribution should be as small as possible. For this purpose, magnetic particles are required to have as narrow a particle size distribution as possible and to include no dendrites.

As described above, magnetic iron based alloy particles which have a narrow particle size distribution, which include no dendrites, which have appropriate particle shape and aspect ratio, and which have a high coercive force and an excellent coercive force distribution, are now in the strongest demand.

Magnetic iron based alloy particles are usually obtained by, if necessary, heat-treating in a non-reducing atmosphere and heat-treating in a reducing gas atmosphere, goethite particles as precursor particles, hematite particles obtained by dehydrating the goethite particles, the goethite particles containing metals other than iron and the hematite particles containing metals other than iron. Consequently, magnetic iron based alloy particles are succeeded to the shape of the goethite particles as precursor particles, and it is known that the larger the aspect ratio of the goethite particles, the larger the aspect ratio of the magnetic iron based alloy particles become. It is, therefore, necessary to use goethite particles having a narrow particle size distribution, including no dendrites, and having appropriate particle shape and aspect ratio in order to produce magnetic iron based alloy particles which have various properties described above. It is also necessary that the magnetic iron based alloy particles should retain and inherit the particle shape and narrow particle size distribution in the heat-treating process.

Various methods are conventionally known as a method of producing goethite particles as a precursor particles of magnetic iron based alloy particles. Especially, the following methods are known as a method of adding a metal compound in advance such as Co compounds which has an effect on improvement of the magnetic properties on the magnetic iron based alloy particles, and Al compounds which has a high anti-sintering effect on the magnetic iron based alloy particles and has an excellent shape retention property.

For example, a method of producing accusal goethite particles comprising oxidizing a suspension containing colloidal ferrous hydroxide which is obtained by adding not more than one equivalent of an aqueous alkali hydroxide solution to a ferrous salt solution in the presence of a cobalt compound, introducing an oxygen-containing gas into the suspension at 50° C., and further bringing the accusal goethite particles into growth reaction (Japanese Patent Application Laid-Open (KOKAI) No. 7-11310 (1995));

a method of producing spindle-shaped goethite particles comprising introducing an oxygen-containing gas into a suspension containing $FeCO_3$ which is obtained by reacting a ferrous salt solution with an acidic Al salt compound with an aqueous alkali carbonate solution with a basic Al salt compound added thereto (Japanese Patent Application Laid-Open (KOKAI) No. 6-228614 (1994));

a method of producing a growth of the goethite seed particles comprising hydrolyzing a neutralized solution of a ferric salt and a Co compound with an aqueous hydroxide solution, and hydrolyzing the neutralized solution, in an aqueous ferric salt solution containing an Al compound with an aqueous hydroxide solution (Japanese Patent Publication No. 58-176902 (1983)); and a method of producing spindle-shaped goethite particles comprising aging, in a non-oxidizing atmosphere, a suspension containing a precipitate comprising ferrous which is obtained by neutralizing an aqueous alkali carbonate solution with a ferrous salt solution, and introducing an oxygen-containing gas into the suspension so as to oxidize the suspension, wherein a Co compound is added in advance to a solution selected from the ferrous salt solution, the suspension containing a precipitate comprising ferrous and the aged suspension containing a precipitate comprising ferrous before the oxidization, and an aqueous solution of a compound of at least one selected from the group consisting of Al, Si, Ca, Mg, Ba, Sr and rare earth elements such as Nd is added to the ferrous salt solution in the course of oxidization at the stage where $Fe^{2+}$ content in the ferrous salt solution is 50 to 90%, under the same condition as that of the oxidization, so that the compound is 0.1 to 5.0 mol % (calculated as the elements added) based on the $Fe^{2+}$ of the ferrous salt solution (Japanese Patent Application Laid-Open (KOKAI) No. 7-126704 (1995)).

Each of the above Japanese Kokais also describes the magnetic iron based alloy particles obtained from the respective goethite particles as precursor particles.

As hematite particles in which the ratio of the X-ray crystallite size is specified, is conventionally known accusal hemnatite fire particles (Japanese Patent Application Laid-Open (KOKAI) No. 7-206446 (1995)), in which the ratio $D_{104}/D_{110}$ of the X-ray crystallite size $D_{104}$ perpendicular to the face (104) and the X-ray crystallite size $D_{110}$ perpendicular to the face (110) is in the range of 1 to 2, and the specific surface area is 40 to 50 $m^2/g$.

The spindle-shaped magnetic iron based alloy particles which have a narrow particle size distribution, include no dendrites, have appropriate particle shape and aspect ratio, and have a high coercive force and an excellent coercive force distribution are now in the strongest demand. The magnetic iron based alloy particles obtained from the goethite particles described in the above-described Japanese Kokais, however, cannot be said to adequately satisfy those properties.

According to the process described in Japanese Patent Application Laid-Open (KOKAI) No. 7-11310 (1995), acicular goethite particles having an aspect ratio of not less than 10 and containing Co are produced. However, dendrite particles are included together with the goethite particles and they cannot be said to have a narrow particle size distribution.

According to the process described in Japanese Patent Application Laid-Open (KOKAI) No. 6-228614 (1994), it is possible to produce goethite particles including no dendrites and having a narrow particle size distribution by adopting an appropriate method of adding Al. However, the aspect ratio cannot be said to be sufficient.

According to the process described in Japanese Patent Application Laid-Open (KOKAI) No. 7-126704 (1995), Al is added in the course of oxidization. However, Co ions still remain in the solution in the course of oxidization. The present inventors found that if Al is added to the solution in the presence of Co ions, and the remaining ferrous ions are oxidized to grow goethite particles, the particles remarkably grow in the direction of a minor axis, so that the aspect ratio is lowered. Accordingly, it is impossible to produce goethite particles having a large aspect ratio, especially, an aspect ratio of not less than 13.

According to the process described in Japanese Patent Application Laid-Open (KOKAI) No. 58-176902 (1983), it is different from the reaction in the present invention in that the reaction mechanism is not oxidization but hydrolysis, and in that hydrothermal reaction is conducted at a high temperature exceeding 100° C. for a secondary reaction.

In addition, it cannot be said that the magnetic iron based alloy particles obtained from the goethite particles produced by each of the methods described above have a narrow particle size distribution, include no dendrites and have a large aspect ratio.

In the acicular hematite particles described in Japanese Patent Application Laid-Open (KOKAI) No. 7-206446 (1995), the X-ray crystallite size ratio ($D_{104}/D_{110}$) is in the range of 1 to 2, which is different from the range specified by the present invention. Since $D_{110}$ is smaller than $D_{104}$, the crystallinity is completely different from that of the magnetic iron based alloy particles of the present invention. Furthermore, the acicular hematite particles are obtained by hydrothermal (autoclaving) reaction. Although hematite particles in which the X-ray crystallite size ratio ($D_{104}/D_{110}$) is 0.7 and which are obtained by heating and dehydrating goethite particles are described as a comparative example, the X-ray crystallite size ratio ($D_{104}/D_{110}$) also is out of the range specified by the present invention.

Accordingly, the technical problems of the present invention is to provide spindle-shaped goethite particles or spindle-shaped hematite particles which have a narrow particle size distribution and include no dendrites, and to provide spindle-shaped magnetic iron based alloy particles which are produced from the said spindle-shaped goethite particles or spindle-shaped hematite particles as precursor particles, and which have a high coercive force and an excellent coercive force distribution.

As a result of studies undertaken by the present inventors so as to solve the above-described problems, it has been found that by aging an aqueous suspension containing a precipitate comprising ferrous which is obtained by reacting (neutralizing) a mixed aqueous alkali solution of an aqueous alkali carbonate solution and an aqueous alkali hydroxide solution with a ferrous salt solution, in a non-oxidizing atmosphere;

introducing (blowing) an oxygen-containing gas into the aqueous suspension so as to produce spindle-shaped goethite seed particles, wherein in the process of producing the seed particles, a cobalt compound in which the Co content is 0.5 to 25 atm % (calculated as Co) based on the total Fe in the spindle-shaped goethite particles is added to one selected from the group consisting of the ferrous salt solution, the aqueous suspension containing the precipitate comprising ferrous, the aqueous suspension containing the precipitate comprising ferrous in the course of aging, i.e., before the beginning of the oxidization reaction, and the aqueous suspension in the course of producing the goethite seed particles;

adding a mixed aqueous alkali solution of an aqueous alkali carbonate solution and an aqueous alkali hydroxide solution and a ferrous salt solution to the aqueous suspension containing the seed particles; and introducing (blowing) an oxygen-containing gas into the aqueous suspension so as to grow goethite on the particle surfaces of the spindle-shaped goethite seed particles, wherein in the process of growing the goethite, an aluminum compound in which the Al content is 0.5 to 15 atm % (calculated as Al) based on the total Fe in the spindle-shaped goethite particles is added to one selected from the group consisting of the aqueous alkali solutions added, the ferrous salt solution, the aqueous suspension containing the spindle-shaped seed particles and the precipitate comprising ferrous before the beginning of the oxidization reaction, and the aqueous suspension in the course of growing the goethite, the obtained spindle-shaped goethite particles have a narrow particle size distribution, include no dendrites and have appropriate particle shape and aspect ratio; and it has been further found that by heating (dehydrating) the spindle-shaped goethite particles, the obtained spindle-shaped hematite particles have a narrow particle size distribution, include no dendrites, have appropriate particle shape and aspect ratio, and have a high coercive force and an excellent coercive force distribution; and by further heat-treating in a reducing gas atmosphere the spindle-shaped goethite particles, the obtained magnetic spindle-shaped iron based alloy particles have a narrow particle size distribution, include no dendrites, have appropriate particle shape and aspect ratio, and have a high coercive force and an excellent coercive force distribution, so that these iron based alloy particles are suitable as magnetic particles for magnetic media having high recording density, high sensitivity and high output. The present invention has been achieved on the basis of this finding.

SUMMARY OF THE INVENTION

It is an object of the present invention to provide spindle-shaped goethite particles or spindle-shaped hematite particles which have a narrow particle size distribution and include no dendrites.

It is an another object of the present invention to provide spindle-shaped magnetic iron based alloy particles having a high coercive force and an excellent coercive force distribution, which are produced from the spindle-shaped goethite particles or spindle-shaped hematite particles as precursor particles.

To accomplish the aim, in a first aspect of the present invention, there are provided spindle-shaped goethite particles comprising:

goethite seed containing cobalt and iron as the main ingredients in which the Co content is 0.5 to 25 atm % (calculated as Co) based on the total Fe in the spindle-shaped goethite particles, and goethite surface layer containing aluminum and iron as the main ingredient in which the Al content is 0.5 to 15 atm % (calculated as Al) based on the total Fe in the spindle-shaped goethite particles; and having an average major axial diameter of 0.05 to 1.0 $\mu$m.

In a second aspect of the present invention, there is provided spindle-shaped goethite particles comprising:

a goethite seed containing cobalt and iron as the main ingredients in which the Co content is 0.5 to 25 atm % (calculated as Co) based on the total Fe in the spindle-shaped goethite particles, and a goethite surface layer containing aluminum and iron as the main ingredient in which the Al content is 0.5 to 15 atm % (calculated as Al) based on the total Fe in the spindle-shaped goethite particles;

an upper surface layer comprising a rare earth element of 0.5 to 15 atm % (calculated as the rare earth element) based on the total Fe in the spindle-shaped goethite particles; and having an average major axial diameter of 0.05 to 1.0 $\mu$m.

In a third aspect of the present invention, there is provided spindle-shaped goethite particles comprising:

a goethite seed containing cobalt and iron as the main ingredients in which the Co content is 0.5 to 25 atm % (calculated as Co) based on the total Fe in the spindle-shaped goethite particles, and a goethite surface layer containing aluminum, a rare earth element and iron as the main ingredient in which the Al content is 0.5 to 15 atm % (calculated as Al) based on the total Fe in the spindle-shaped goethite particles and the content of the rare earth element is 0.5 to 10 atm % (calculated as the rare earth element) based on the total Fe in the spindle-shaped goethite particles; and having an average major axial diameter of 0.05 to 1.0 $\mu$m.

In a fourth aspect of the present invention, there is provided spindle-shaped hematite particles having an average major axial diameter of 0.05 to 1.0 $\mu$m and a ratio $D_{104}/D_{110}$ of an X-ray crystallite size of 0.20 to 0.65.

In a fifth aspect of the present invention, there is provided spindle-shaped hematite particles derived from the spindle-shaped goethite particles of the first aspect comprising:

a hematite seed containing cobalt and iron as the main ingredients in which the Co content is 0.5 to 25 atm % (calculated as Co) based on the total Fe in the spindle-shaped hematite particles, and a hematite surface layer containing aluminum and iron as the main ingredient in which the Al content is 0.5 to 15 atm % (calculated as Al) based on the total Fe in the spindle-shaped hematite particles; and having an average major axial diameter of 0.05 to 1.0 $\mu$m.

In a sixth aspect of the present invention, there is provided spindle-shaped hematite particles derived from the spindle-shaped goethite particles of the second aspect comprising:

a hematite seed containing cobalt and iron as the main ingredients in which the Co content is 0.5 to 25 atm % (calculated as Co) based on the total Fe in the spindle-shaped hematite particles, a hematite surface layer containing aluminum and iron as the main ingredient in which the Al content is 0.5 to 15 atm % (calculated as Al) based on the total Fe in the spindle-shaped hematite particles, and an upper surface layer comprising a rare earth element of 0.5 to 15 atm % (calculated as the rare earth element) based on the total Fe in the spindle-shaped hematite particles; and having an average major axial diameter of 0.05 to 1.0 μm.

In a seventh aspect of the present invention, there is provided spindle-shaped hematite particles derived from the spindle-shaped goethite particles of the third aspect comprising:

a hematite seed containing cobalt and iron as the main ingredients in which the Co content is 0.5 to 25 atm % (calculated as Co) based on the total Fe in the spindle-shaped hematite particles, and a hematite surface layer containing aluminum, a rare earth element and iron as the main ingredient in which the Al content is 0.5 to 15 atm % (calculated as Al) based on the total Fe in the spindle-shaped hematite particles and the content of the rare earth element is 0.5 to 10 atm % (calculated as rare earth element) based on the total Fe in the spindle-shaped hematite particles; and having an average major axial diameter of 0.05 to 1.0 μm.

In an eighth aspect of the present invention, there is provided hematite particles having an average major axial diameter of 0.05 to 1.0 μm and a ratio $D_{104}/D_{110}$ of an X-ray crystallite size of 0.20 to 0.65; and comprising a hematite seed containing 0.5 to 25 atm % of Co based on the total Fe in the spindle-shaped hematite particles, and a hematite surface layer containing 0.5 to 15 atm % of Al based on the total Fe in the spindle-shaped hematite particles.

In a ninth aspect of the present invention, there is provided spindle-shaped hematite particles comprising:

a hematite seed containing 0.5 to 25 atm % of Co based on the total Fe in the spindle-shaped hematite particles, a hematite surface layer containing 0.5 to 15 atm % of Al based on the total Fe in the spindle-shaped hematite particles, and an upper surface layer comprising a rare earth element of 0.5 to 15 atm %, calculated as the rare earth element, based on the total Fe in the spindle-shaped hematite particles; and having an average major axial diameter of 0.05 to 1.0 μm and a ratio $D_{104}/D_{110}$ of an X-ray crystallite size of 0.20 to 0.65.

In a tenth aspect of the present invention, there is provided spindle-shaped hematite particles comprising:

a hematite seed containing 0.5 to 25 atm % of Co based on the total Fe in the spindle-shaped hematite particles, and a hematite surface layer containing 0.5 to 15 atm % of Al based on the total Fe in the spindle-shaped hematite particles and 0.5 to 10 atm % of a rare earth element based on the total Fe in the spindle-shaped hematite particles; and having an average major axial diameter of 0.05 to 1.0 μm and a ratio $D_{104}/D_{110}$ of an X-ray crystallite size of 0.20 to 0.65.

In an eleventh aspect of the present invention, there is provided spindle-shaped magnetic iron based alloy particles derived from the spindle-shaped goethite particles of the fifth aspect comprising:

containing cobalt, aluminum and iron as the main ingredients in which the Co content is 0.5 to 25 atm % (calculated as Co) based on the total Fe in the spindle-shaped magnetic iron based alloy particles and the Al content is 0.5 to 15 atm % (calculated as Al) based on the total Fe in the spindle-shaped magnetic iron based alloy particles; and having an average major axial diameter of 0.05 to 0.5 μm.

In a twelfth aspect of the present invention, there is provided spindle-shaped magnetic iron based alloy particles derived from the spindle-shaped hematite particles of the sixth aspect;

containing cobalt, aluminum, a rare earth element and iron as the main ingredients in which the Co content is 0.5 to 25 atm % (calculated as Co) based on the total Fe in the spindle-shaped magnetic iron based alloy particles and the Al content is 0.5 to 15 atm % (calculated as Al) based on the total Fe in the spindle-shaped magnetic iron based alloy particles and the content of the rare earth element is 0.5 to 15 atm % (calculated as the rare earth element) based on the total Fe in the spindle-shaped magnetic iron based alloy particles; and having an average major axial diameter of 0.05 to 0.5 μm.

In a thirteenth aspect of the present invention, there is provided spindle-shaped magnetic iron based alloy particles derived from the spindle-shaped hematite particles of the seventh aspect;

containing cobalt, aluminum, a rare earth element and iron as the main ingredients in which the Co content is 0.5 to 25 atm % (calculated as Co) based on the total Fe in the spindle-shaped magnetic iron based alloy particles and the Al content is 0.5 to 15 atm % (calculated as Al) based on the total Fe in the spindle-shaped magnetic iron based alloy particles and the content of the rare earth element is 0.5 to 10 atm % (calculated as the rare earth element) based on the total Fe in the spindle-shaped magnetic iron based alloy particles; and having an average major axial diameter of 0.05 to 0.5 μm.

In a fourteenth aspect of the present invention, there is provided a process for producing spindle-shaped goethite particles, comprising the steps of:

aging an aqueous suspension containing a precipitate comprising ferrous obtained by reacting a mixed aqueous alkali solution of an aqueous alkali carbonate solution and an aqueous alkali hydroxide solution with a ferrous salt solution, in a non-oxidizing atmosphere;

introducing (blowing) an oxygen-containing gas into the aqueous suspension to produce spindle-shaped goethite seed particles;

adding a ferrous salt solution, and a mixed aqueous alkali solution of an aqueous alkali carbonate solution and an aqueous alkali hydroxide solution to the aqueous suspension containing the seed particles; and introducing (blowing) an oxygen-containing gas into the aqueous suspension to grow goethite on the particle surfaces of the spindle-shaped goethite seed particles, thereby obtaining the spindle-shaped goethite particles of the first aspect;

wherein in the process of producing the seed particles, a cobalt compound in which the Co content is 0.5 to 25 atm % (calculated as Co) based on the total Fe in the spindle-shaped goethite particles is added to one selected from the group consisting of the ferrous salt solution, the aqueous suspension containing the precipitate comprising ferrous, the aqueous suspension containing the precipitate comprising ferrous in the course of aging, i.e., before the beginning of the oxidization reaction, and the aqueous suspension in the course of producing the goethite seed particles; and in the process of growing the goethite, an aluminum compound in which the Al content is 0.5 to 15 atm % (calculated as Al) based on the total Fe in the spindle-shaped goethite particles is added to one selected from, the group consisting of the aqueous alkali solutions added, the ferrous salt solution, the aqueous suspension containing the spindle-shaped seed particles and the precipitate comprising ferrous before the beginning of the oxidization reaction, and the aqueous suspension in the course of growing the goethite.

In a fifteenth aspect of the present invention, there is provided a process for producing spindle-shaped goethite particles, comprising the steps of:

aging an aqueous suspension containing a precipitate comprising ferrous obtained by reacting a mixed aqueous alkali solution of an aqueous alkali carbonate solution and an aqueous alkali hydroxide solution with a ferrous salt solution, in a non-oxidizing atmosphere;

introducing (blowing) an oxygen-containing gas into the aqueous suspension to produce spindle-shaped goethite seed particles;

adding a ferrous salt solution, and a mixed aqueous alkali solution of an aqueous alkali carbonate solution and an aqueous alkali hydroxide solution to the aqueous suspension containing the seed particles; and introducing (blowing) an oxygen-containing gas into the aqueous suspension to grow goethite on the particle surfaces of the spindle-shaped goethite seed particles, thereby obtaining the spindle-shaped goethite particles of the third aspect;

wherein in the process of producing the seed particles, a cobalt compound in which the Co content is 0.5 to 25 atm % (calculated as Co) based on the total Fe in the spindle-shaped goethite particles is added to one selected from the group consisting of the ferrous salt solution, the aqueous suspension containing the precipitate comprising ferrous, the aqueous suspension containing the precipitate comprising ferrous in the course of aging, i.e., before the beginning of the oxidization reaction, and the aqueous suspension in the course of producing the goethite seed particles; and in the process of growing the goethite, an aluminum compound in which the Al content is 0.5 to 15 atm % (calculated as Al) based on the total Fe in the spindle-shaped goethite particles and a compound of a rare earth element in which the content of the rare earth element is 0.5 to 15 atm % (calculated as the rare earth element) based on the total Fe in the spindle-shaped goethite particles are added to one selected from the group consisting of the aqueous alkali solutions added, the ferrous salt solution, the aqueous suspension containing the spindle-shaped seed particles and the precipitate comprising ferrous before the beginning of the oxidization reaction, and the aqueous suspension in the course of growing the goethite.

In a sixteenth aspect of the present invention, there is provided process for producing spindle-shaped hematite particles, comprising the steps of:

aging an aqueous suspension containing a precipitate comprising ferrous obtained by reacting a mixed aqueous alkali solution of an aqueous alkali carbonate solution and an aqueous alkali hydroxide solution with a ferrous salt solution, in a non-oxidizing atmosphere;

introducing (blowing) an oxygen-containing gas into the aqueous suspension to produce spindle-shaped goethite seed particles;

adding a ferrous salt solution, and a mixed aqueous alkali solution of an aqueous alkali carbonate solution and an aqueous alkali hydroxide solution to the aqueous suspension containing the seed particles;

introducing (blowing) an oxygen-containing gas into the aqueous suspension to grow goethite on the particle surfaces of the spindle-shaped goethite seed particles;

adding a compound of a rare earth element in which the content of the rare earth element is 0.5 to 10 atm % (calculated as the rare earth element) based on the total Fe spindle-shaped hematite particles as an anti-sintering for treating the surfaces of the spindle-shaped goethite particles; and dehydrating the spindle-shaped goethite particles at a temperature of 400 to 850° C., thereby obtaining the spindle-shaped hematite particles of the sixth aspect;

wherein in the process of producing the seed particles, a cobalt compound in which the Co content is 0.5 to 25 atm % (calculated as Co) based on the total Fe in the spindle-shaped hematite particles is added to one selected from the group consisting of the ferrous salt solution, the aqueous suspension containing the precipitate comprising ferrous, the aqueous suspension containing the precipitate comprising ferrous in the course of aging, i.e., before the beginning of the oxidization reaction, and the aqueous suspension in the course of producing the goethite seed particles; and in the process of growing the goethite, an aluminum compound in which the Al content is 0.5 to 15 atm % (calculated as Al) based on the total Fe in the spindle-shaped hematite particles is added to one selected from the group consisting of the aqueous alkali solutions added, the ferrous salt solution, the aqueous suspension containing the spindle-shaped seed particles and the precipitate comprising ferrous before the beginning of the oxidization reaction, and the aqueous suspension in the course of growing the goethite.

In a seventeenth aspect of the present invention, there is provided process for producing spindle-shaped magnetic iron based alloy particles, comprising the steps of:

aging an aqueous suspension containing a precipitate comprising ferrous obtained by reacting a mixed aqueous alkali solution of an aqueous alkali carbonate solution and an aqueous alkali hydroxide solution with a ferrous salt solution, in a non-oxidizing atmosphere;

introducing (blowing) an oxygen-containing gas into the aqueous suspension to produce spindle-shaped goethite seed particles;

adding a ferrous salt solution, and a mixed aqueous alkali solution of an aqueous alkali carbonate solution and an aqueous alkali hydroxide solution to the aqueous suspension containing the seed particles;

introducing (blowing) an oxygen-containing gas into the aqueous suspension to grow goethite on the particle surfaces of the spindle-shaped goethite seed particles;

treating the obtained spindle-shaped goethite particles with an anti-sintering agent;

heating the spindle-shaped goethite particles at a temperature of 400 to 850° C.; and heat-treating the spindle-shaped goethite particles in a reducing gas atmosphere at 400 to 600° C., thereby obtaining the spindle-shaped magnetic iron based alloy particles of the eleventh aspect;

wherein in the process of producing the seed particles, a cobalt compound in which the Co content is 0.5 to 25 atm %, calculated as Co, based on the total Fe in the spindle-shaped goethite particles is added to one selected from the group consisting of the ferrous salt solution, the aqueous suspension containing the precipitate comprising ferrous, the aqueous suspension containing the precipitate comprising ferrous in the course of aging, i.e., before the beginning of the oxidization reaction, and the aqueous suspension in the course of producing the goethite seed particles; and in the process of growing the goethite, an aluminum compound in which the Al content is 0.5 to 15 atm %, calculated as Al, based on the total Fe in the spindle-shaped goethite particles is added to one selected from the group consisting of the aqueous alkali solutions added, the ferrous salt solution, the aqueous suspension containing the spindle-shaped seed particles and the precipitate comprising ferrous before the beginning of the oxidization reaction, and the aqueous suspension in the course of growing the goethite.

In an eighteenth aspect of the present invention, there is provided process for producing spindle-shaped magnetic iron based alloy particles, comprising the step of:

aging an aqueous suspension containing a precipitate comprising ferrous obtained by reacting a mixed aqueous alkali solution of an aqueous alkali carbonate solution and an aqueous alkali hydroxide solution with a ferrous salt solution, in a non-oxidizing atmosphere;

introducing (blowing) an oxygen-containing gas into the aqueous suspension to produce spindle-shaped goethite seed particles;

adding a ferrous salt solution, and a mixed aqueous alkali solution of an aqueous alkali carbonate solution and an aqueous alkali hydroxide solution to the aqueous suspension containing the seed particles;

introducing (blowing) an oxygen-containing gas into the aqueous suspension to grow goethite on the particle surfaces of the spindle-shaped goethite seed particles;

adding a compound of a rare earth element in which the content of the rare earth element is 0.5 to 10 atm %, calculated as the rare earth element, based on the total Fe spindle-shaped hematite particles as an anti-sintering for treating the surfaces of the spindle-shaped goethite particles;

dehydrating the spindle-shaped goethite particles at a temperature of 400 to 850° C.; and heat-treating the obtained spindle-shaped hematite particles in a reducing gas atmosphere at 400 to 600° C., thereby obtained the spindle-shaped magnetic iron based alloy particles of the twelfth aspect;

wherein in the process of producing the seed particles, a cobalt compound in which the Co content is 0.5 to 25 atm %, calculated as Co, based on the total Fe in the spindle-shaped hematite particles is added to one selected from the group consisting of the ferrous salt solution, the aqueous suspension containing the precipitate comprising ferrous, the aqueous suspension containing the precipitate comprising ferrous in the course of aging, i.e., before the beginning of the oxidization reaction, and the aqueous suspension in the course of producing the goethite seed particles; and in the process of growing the goethite, an aluminum compound in which the Al content is 0.5 to 15 atm %, calculated as Al, based on the total Fe in the spindle-shaped hematite particles is added to one selected from the group consisting of the aqueous alkali solutions added, the ferrous salt solution, the aqueous suspension containing the spindle-shaped seed particles and the precipitate comprising ferrous before the beginning of the oxidization reaction, and the aqueous suspension in the course of growing the goethite.

DETAILED DESCRIPTION OF THE INVENTION

Figure 1:
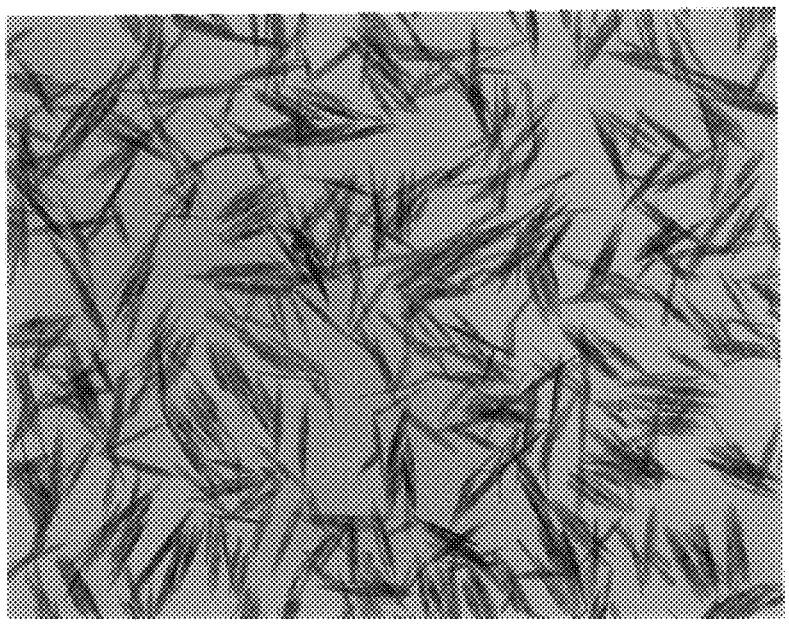
FIG. 1 is an electron micrograph (×30000) of the structure of spindle-shaped goethite seed particles in Example 1 of according to the present invention.

The spindle-shaped goethite particles according to the present invention will first be described.

The spindle-shaped goethite particles according to the present invention have an average major axial diameter of 0.05 to 1.0 μm, preferably 0.05 to 0.5 μm, and have an aspect ratio (major axial diameter/minor axial diameter) of 10 to 15, preferably 13 to 15.

The spindle-shaped goethite particles of the present invention have a BET specific surface area of 50 to 180 m²/g, preferably 60 to 150 m²/g.

The spindle-shaped goethite particle of the present invention comprises a seed crystal and a surface layer.

The seed crystal comprises a goethite seed produced by the oxidization of all the ferrous salt added. More specifically, the seed crystal is a portion dependent upon the weight ratio of the ferrous salt added in the process of producing goethite seed particles and the ferrous salt added in the growth reaction. Preferably, the seed crystal is a portion of 50 to 80 wt %, more preferably 55 to 75 wt % from the center of the goethite particle.

The content of Co contained in the seed crystal is 0.5 to 25 atm %, preferably 1.0 to 20 atm % (calculated as Co)

based on the total Fe in the goethite particles. If the Co content is less than 0.5 atm %, it is impossible to obtain the effect on the improvement of the magnetic properties. If the Co content exceeds 25 atm %, a large aspect ratio can not be obtained.

The surface layer comprises a goethite layer grown on the particle surface of the goethite seed particle by the oxidization of the ferrous salt added in the growth reaction. More specifically, the surface layer is a portion of 20 to 50 wt %, more preferably 25 to 45 wt % from the upper surface of the particle.

The content of Al contained in the goethite as the surface layer is 0.5 to 15 atm %, preferably 1.0 to 10 atm % (calculated as Al) based on the total Fe in the goethite particles. If the Al content is less than 0.5 atm %, it is impossible to obtain the anti-sintering effect. If the Al content exceeds 15 atm %, it is difficult to obtain a large aspect ratio.

The goethite as the surface layer may contain rare earth elements. The content of rare earth elements is 0.5 to 10 atm %, preferably 1.0 to 6.0 atm % (calculated as the rare earth element) based on the total Fe in the goethite particles. The rare earth elements contained in the goethite layer as the surface layer are, for example, Sc, Y, La, Ce, Pr, Nd and Sm. The rare earth elements contained may be a single element or not less than two elements.

The spindle-shaped hematite particles according to the present invention will be described below.

The spindle-shaped hematite particles according to the present invention have an average major axial diameter of 0.05 to 1.0 μm, preferably 0.05 to 0.5 μm, and have an aspect ratio (major axial diameter/minor axial diameter) of 10 to 15, preferably 11 to 15.

The spindle-shaped hematite particles of the present invention have a BET specific surface area of 30 to 140 m.²/g, preferably 35 to 100 m²/g.

The spindle-shaped hematite particle of the present invention comprises a seed crystal (hematite seed particles;, and a surface layer (hematite surface layer).

The part of the seed crystal of the hematite particle is a part converted from the seed crystal of the goethite particles as it is, through dehydration. Preferably, the seed crystal is a portion of 50 to 80 wt %, more preferably 55 to 75 wt % from the center of the hematite particle.

The content of Co contained in the seed crystal is 0.5 to 25 atm %, preferably 1.0 to 20 atm % (calculated as Co) based on the total Fe in the hematite particles. If the Co content is less than 0.5 atm %, it is impossible to obtain the effect on the improvement of the magnetic properties. If the Co content exceeds 25 atm %, a large aspect ratio can not be obtained.

The surface layer of the hematite particle is a part converted from the surface layer of goethite particles as it is, through dehydration. Preferably, the surface layer is a portion of 20 to 50 wt %, more preferably 25 to 45 wt % from the upper surface of the particle.

The content of Al contained in the hematite layer as the surface layer is 0.5 to 15 atm %, preferably 1.0 to 10 atm % (calculated as Al) based on the total Fe in the hematite particles. If the Al content is less than 0.5 atm %, it is impossible to obtain the anti-sintering effect. If the Al content exceeds 15 atm %, it is difficult to obtain a large aspect ratio.

The hematite surface layer may contain a rare earth element. The content of the rare earth element is 0.5 to 15 atm %, preferably 1.0 to 12.0 atm % (calculated as rare earth element) based on the total Fe in the hematite particles. If the content is less than 0.5 atm %, the anti-sintering effect for converting (dehydrating) the goethite particles to hematite particles is insufficient, so that the particles may be sintered and when the magnetic iron based alloy particles are produced from such hematite particles, the coercive force distribution (S.F.D.) disadvantageously becomes worse. If the content exceeds 15 atm %, the saturation magnetization may be lowered.

The hematite surface layer may contain a rare earth element. The content of the rare earth element is 0.5 to 10 atm %, preferably 1.0 to 6.0 atm % (calculated as rare earth element) based on the total Fe in the hematite particles. If the content is less than 0.5 atm %, the anti-sintering effect for converting (dehydrating) the goethite particles to hematite particles is insufficient, so that the particles may be sintered and when the magnetic iron based alloy particles are produced from such hematite particles, the coercive force distribution (S.F.D.) disadvantageously becomes worse. If the content exceeds 10 atm %, the saturation magnetization may be lowered.

As the rare earth element, scandium, yttrium, lanthanum, cerium, praseodymium, neodymium, samarium, etc. are preferably used. The compounds of a rare earth element on the particle surfaces are, for example, oxide, hydroxide and hydrous oxide thereof.

In the spindle-shaped hematite particles of the present invention, the ratio $D_{104}/D_{110}$ of the X-ray crystallite sizes $D_{104}$ and $D_{110}$ is preferably 0.20 to 0.65. Particularly, when the content "x" (atm %) of the compound of a rare earth element on the particle surfaces calculated as the rare earth element based on the total Fe is 0.5 to 10 ($0.5 \leq x \leq 10$), the ratio $D_{104}/D_{110}$ preferably satisfies the following relationship:

$$0.500 - 0.03x \leq D_{104}/D_{110} \leq 0.665 - 0.03x.$$

When the content x is 10 to 15 ($10 < x \leq 15$), the ratio $D_{104}/D_{110}$ preferably satisfies the following relationship:

$$0.20 \leq D_{104}/D_{110} \leq 0.365.$$

Figure 11:
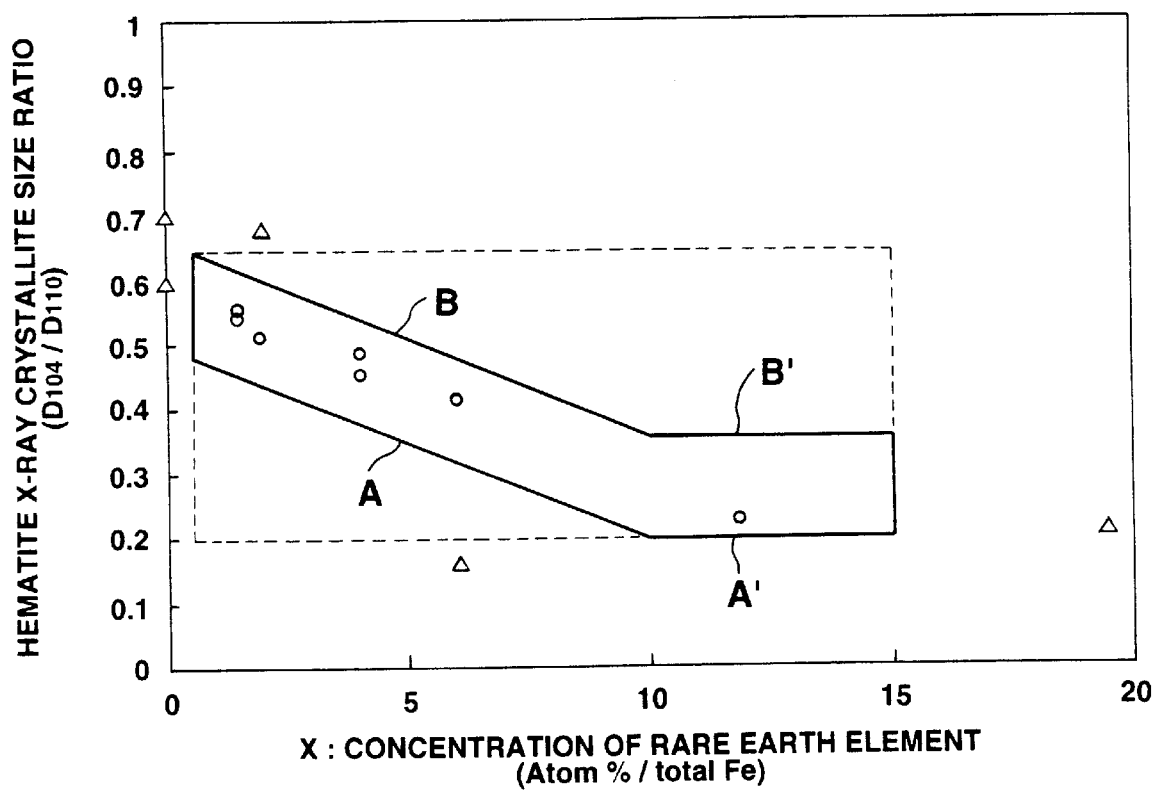
FIG. 11 shows the relationship between the content (atm %) of a compound of a rare earth element calculated as the rare earth element based on the total Fe metal and the ratio $D_{104}/D_{110}$ of the X-ray crystallite size in the spindle-shaped hematite particles in Examples 15 and 24 to 30, and Comparative Examples 14 to 18.

This range is shown in FIG. 11. When the ratio $D_{104}/D_{110}$ of the X-ray crystalline sizes is less than 0.20 or exceeds 0.65, the S.F.D. (coercive force distribution) of a sheet produced by using such magnetic iron based alloy particles obtained by reducing the spindle-shaped hematite particles is deteriorated.

The spindle-shaped magnetic iron based alloy particles according to the present invention will be explained in the following.

The spindle-shaped magnetic iron based alloy particles according to the present invention have an average major axial diameter of 0.05 to 0.50 μm, preferably 0.06 to 0.3 μm, and have an aspect ratio (major axial diameter/minor axial diameter) of not less than 9, preferably not less than 9.5, more preferably 9.5 to 11.

The spindle-shaped magnetic iron based alloy particles of the present invention have a BET specific surface area of 30 to 80 m²/g preferably 35 to 60 m²/g.

The spindle-shaped magnetic iron based alloy particles of the present invention contain 0.5 to 25 atm %, preferably 1.0 to 20 atm % of Co based on the total Fe in the magnetic iron based alloy particles, and 0.5 to 15 atm %, preferably 1.0 to 10 atm % of Al based on the total Fe in the magnetic iron based alloy particles, and 0.5 to 15 atm %, preferably 1.0 to 12.0 atm % of rare earth element based on the total Fe in the magnetic iron based alloy particles.

The spindle-shaped magnetic iron based alloy particles of the present invention have a 1200 to 2200 Oe, preferably 1500 to 2000 Oe, and a saturation magnetization σs of not less than 100 emu/g, preferably not less than 110 emu/g.

The coercive force distribution (S.F.D.) of the sheet produced by using the spindle-shaped magnetic iron based alloy particles of the present invention, is not more than 0.50, preferably not more than 0.45.

Alternatively, the spindle-shaped magnetic iron based alloy particles of the present invention preferably contain 0.5 to 25 atm %, more preferably 1.0 to 20 atm % of Co based on the total Fe in the magnetic iron based alloy particles, 0.5 to 15 atm %, more preferably 1.0 to 10 atm % of Al based on the total Fe in the magnetic iron based alloy particles, and 0.5 to 15 atm %, more preferably 1.0 to 12.0 atm % of a rare earth element which is added after the synthesis of the goethite particles, based on the total Fe in the magnetic iron based alloy particles. In this case, the spindle-shaped magnetic iron based alloy particles have a coercive force Hc of preferably 1200 to 2200 Oe, more preferably 1500 to 2000 Oe, and a saturation magnetization σs of preferably not less than 100 emu/g, more preferably not less than 110 emu/g. The coercive force distribution (S.F.D.) of the sheet produced by using the spindle-shaped magnetic iron based alloy particles of the present invention, is preferably not more than 0.47, more preferably not more than 0.44.

Furthermore, the spindle-shaped magnetic iron based alloy particles of the present invention preferably contain 0.5 to 25 atm %, more preferably 1.0 to 20 atm % of Co based on the total Fe in the magnetic iron based alloy particles, 0.5 to 15 atm %, more preferably 1.0 to 10 atm % of Al based on the total Fe in the magnetic iron based alloy particles, and 0.5 to 10 atm %, more preferably 1.0 to 6.0 atm % of a rare earth element which is present in the course of the growth reaction of the goethite particles, based on the total Fe in the magnetic iron based alloy particles. in this case, the spindle-shaped magnetic iron based alloy particles have a coercive force Hc of preferably 1400 to 2200 Oe, more preferably 1600 to 2100 Oe, and a saturation magnetization σs of preferably not less than 110 emu/g, more preferably not less than 120 emu/g. The coercive force distribution (S.F.D.) of the sheet produced by using the spindle-shaped magnetic iron based alloy particles of the present invention, is preferably not more than 0.455, more preferably not more than 0.42. In case of using the compound of the rare earth element as an anti-sintering agent, the total content of the rare earth element is 0.5 to 15 atm %, preferably 1.0 to 12.0 atm % (calculated as rare earth element) based on the total Fe in the magnetic iron based alloy particles.

The process for producing the spindle-shaped goethite particles according to the present invention will now be described.

The spindle-shaped goethite particles according to the present invention are produced by producing spindle-shaped goethite seed particles and then growing goethite on the surfaces of the seed particles.

The spindle-shaped goethite seed particles are produced by aging an aqueous suspension containing a precipitate comprising ferrous which is obtained by reacting a mixed aqueous alkali solution of an aqueous alkali carbonate solution and an aqueous alkali hydroxide solution with a ferrous salt solution, in a non-oxidizing atmosphere, and introducing an oxygen-containing gas into the aqueous suspension, wherein a Co compound of 0.5 to 25 atm % (calculated as Co) based on the total Fe in the goethite particles is added to one selected from the group consisting of the ferrous salt solution, the aqueous suspension containing a precipitate comprising ferrous in the course of producing the seed particles, the aqueous suspension containing a precipitate comprising ferrous in the course of aging and before the beginning of the oxidization reaction, and the aqueous suspension in the course of producing the goethite seed particles.

In the process of producing the spindle-shaped goethite seed particles, aqueous ferrous sulfate, aqueous ferrous chloride, etc. are usable as the ferrous salt solution.

The concentration of the ferrous in the ferrous salt solution is 0.1 to 1.0 mol/liter, preferably 0.2 to 0.8 mol/liter (calculated as $Fe^{2+}$) in the aqueous suspension containing a precipitate comprising ferrous. If the concentration is less than 0.1 mol/liter, the yield becomes very small for industry. If the concentration exceeds 1.0 mol/liter, the particle size distribution disadvantageously becomes broad.

Examples of the aqueous alkali solution usable in the process of producing the spindle-shaped goethite seed particles are as follows. As the aqueous alkali carbonate solution, aqueous sodium carbonate, aqueous potassium carbonate, aqueous ammonium carbonate, etc. are usable. As the aqueous alkali hydroxide solution mixed with the aqueous alkali carbonate solution, aqueous sodium hydroxide, aqueous potassium hydroxide, etc. are usable.

The mixed aqueous alkali solution is obtained by mixing the aqueous alkali carbonate solution and the aqueous alkali hydroxide solution. The mixing percentage of the aqueous alkali hydroxide solution is 5 to 35 mol %, preferably 10 to 35 mol %, more preferably 15 to 35 mol %. If the mixing percentage is less than 5 mol %, a sufficient aspect ratio is not obtained. If it exceeds 35 mol %, magnetite particles are sometimes contained.

The amount of mixed aqueous alkali solution used is 1.3 to 3.5, preferably 1.5 to 2.5 in equivalent based on the total Fe in the ferrous salt solution. If it is less than 1.3, magnetite particles are sometimes contained therein. If it exceeds 3.5, it is industrially unfavorable.

The pH of the aqueous suspension in the process of producing the spindle-shaped goethite seed particles is in the range of 8.0 to 11.0, preferably 8.5 to 10.0. If the pH is less than 8.0, the concentration of acidic ions in the goethite particles increases, so that they cannot be easily removed by washing, and when the magnetic iron based alloy particles are produced by using such goethite particles, the sintering in particles is caused. When the pH exceeds 11.0, the objective high coercive force is not obtained in the magnetic iron based alloy particles produced from such goethite particles.

The oxidization in the process of producing the spindle-shaped goethite seed particles is conducted by introducing an oxygen-containing gas (e.g., air) into the aqueous suspension.

The temperature in the process of producing the spindle-shaped goethite seed particles is not more than 80° C., at which goethite particles are generally produced. If the temperature exceeds 80° C., magnetite particles are sometimes contained in the spindle-shaped goethite particles. The preferable temperature is in the range of 45 to 55° C.

Examples of the Co compound used in the process of producing the spindle-shaped goethite seed particles are cobalt sulfate, cobalt chloride, cobalt nitrate, etc. The Co compound is added to one selected from the group consisting of the ferrous salt solution, the aqueous suspension containing a precipitate comprising ferrous in the process of producing the seed particles, the aqueous suspension containing a precipitate comprising ferrous in the course of aging and before the beginning of the oxidization, and the aqueous suspension in the course of producing the goethite seed particles. Addition of the Co compound immediately until the beginning of the oxidization is especially preferable.

The amount of Co compound added is 0.5 to 25 atm %, preferably 1.0 to 20 atm % based on the total Fe in the spindle-shaped goethite particles. If it is less than 0.5 atm %, the effect on the improvement of the magnetic properties is not obtained. If it exceeds 25 atm %, the particles become so fine as to lower the aspect ratio.

After a mixed aqueous alkali solution of an aqueous alkali carbonate solution and an aqueous alkali hydroxide solution, and a ferrous salt solution are newly added to the aqueous suspension containing the spindle-shaped goethite seed particles, an oxygen-containing gas is introduced into the aqueous suspension so as to grow goethite on the particle surfaces of the spindle-shaped goethite seed particles, thereby producing the objective spindle-shaped goethite particles. In this process, 0.5 to 15 atm % of an Al compound (calculated as Al) based on the total Fe is added to one selected from the group consisting of the aqueous alkali solutions added, the ferrous salt solution, the aqueous suspension including the spindle-shaped seed particles and a precipitate containing ferrous before the beginning of the oxidization reaction, and the aqueous suspension in the course of growing the goethite.

In the process of growing the goethite, aqueous ferrous sulfate, aqueous ferrous chloride, etc. are usable as the ferrous salt solution.

The amount of ferrous added is 20 to 50 mol %, preferably 25 to 45 mol % of the total amount of ferrous salt added containing the ferrous salt added in the course of producing the goethite seed particles. If it is less than 20 mol %, the growth reaction of the goethite is not sufficient to produce the target spindle-shaped goethite particles. If it exceeds 50 mol %, new goethite seed particles are produced, so that dendrites are produced and the particle particles distribution becomes broader.

The aqueous alkali solutions used in the growth reaction of the goethite can be selected from those used in the course of producing the spindle-shaped goethite seed, and the amount of aqueous alkali solution added can also be selected from the same ranges described above.

The conditions for the growth reaction of the goethite are preferably as much the same as the conditions for the production of spindle-shaped goethite seed particles. It is further preferable that the ratio of the aqueous alkali hydroxide solution in the mixed aqueous alkali solution and the equivalence ratio of the alkali to the total Fe in the ferrous salt solution are the same as those in the process of producing the goethite seed particles.

The pH of the aqueous suspension in the course of growing the goethite is in the range of 8.0 to 11.0, preferably 8.5 to 10.0. If the pH is less than 8.0, the concentration of acidic ions in the goethite particles increases, so that they cannot be easily removed by washing, and when the magnetic iron based alloy particles are produced by using such goethite particles, sintering between particles is caused. When the pH exceeds 11.0, the objective high coercive force is not obtained in the magnetic iron based alloy particles produced from such goethite particles.

The difference in the pH of the aqueous suspension between the process of producing the spindle-shaped goethite seed particles and the growth reaction of the goethite is usually in the range of ±0.5. If the difference in the pH exceeds ±0.5, the coercive force of the magnetic iron based alloy particles becomes insufficient. The difference thereof is preferably ±0.3, more preferably ±0.1.

The oxidization in the process of growing the goethite is conducted by introducing an oxygen-containing gas (e.g., air) into the aqueous suspension.

The temperature in the process of growing the goethite is not higher than 80° C. at which goethite particles are generally produced. If the temperature exceeds 80° C., magnetite is sometimes contained in the spindle-shaped goethite particles. The preferable temperature is in the range of 45 to 55° C.

Examples of the Al compound used in the process of growing the goethite are acid salts such as aluminum sulfate, aluminum chloride and aluminum nitrate, and aluminates such as sodium aluminate, potassium aluminate and ammonium aluminate. The Al compound may be added to any of the ferrous salt solution and the aqueous alkali solutions added in the growth reaction, the aqueous suspension containing the spindle-shaped seed particles and a precipitate comprising ferrous before introducing the oxygen-containing gas, and the aqueous suspension in the course of growing the goethite. It is especially preferable to add the Al compound before the beginning of the growth reaction of the goethite. Alternatively, the Al compound may be added partially in quantitative, continuously or intermittently without reducing the effect, or rather to a better effect.

In this case, it is important that the Al compound is added when no Co ion remains in the aqueous suspension. If the Al compound is added when the Co ion remains in the aqueous suspension, the aspect ratio of the goethite particles produced is unfavorably lowered.

The amount of Al compound added is 0.5 to 15 atm %, preferably 1.0 to 10 atm % based on the total Fe in the spindle-shaped goethite particles. If it is less than 0.5 atm %, the anti-sintering effect is no. obtained. If it exceeds 15 atm %, the aspect ratio of the goethite particles is lowered.

In the production of the spindle-shaped goethite seed particles, it is preferable that a non-oxidizing gas is introduced into the aqueous suspension containing a precipitate comprising ferrous, stirring, that is, "the aging of the suspension". The suspension is preferably aged in the non-oxidizing atmosphere generally in a temperature range of 40 to 80° C. If the temperature is lower than 40° C., a sufficient aging effect is difficult to obtain, so that the aspect ratio of the goethite particles is small. On the other hand, if the temperature exceeds 80° C., magnetite is sometimes contained. The aging time as 30 to 300 minutes. If the aging time is shorter than 30 minuses, it is difficult to obtain a sufficient large aspect ratio. The aging time may exceed 300 minutes, but such an aging time is meaningless.

The aging may be conducted in the process of growing the goethite.

The non-oxidizing atmosphere may be obtained by introducing an inert gas (e.g., nitrogen gas) or a reducing gas (e.g., hydrogen gas) into the reactor.

In the present invention, ax least one selected from the group consisting of the compounds such as a Mg compound and the compound of a rare earth element which are generally added in the process of producing the spindle-shaped goethite particles, may be added in the process of producing the seed particles or in the course of the growth reaction in order to improve various properties of the magnetic iron based alloy particles produced therefrom.

As the compound of a rare earth element added in the growth reaction of the goethite, at least one selected from the group consisting of the chlorides, sulfates and nitrates of scandium, scandium, yttrium, lanthanum, cerium, praseodymium, neodymium and samarium is preferably usable.

The compound of a rare earth element may be added simultaneously with or separately from the addition of the Al compound. The compound of a rare earth element may be added to any of the ferrous salt solution and the aqueous alkali solutions added in the growth reaction, the aqueous suspension containing the spindle-shaped seed particles and a precipitate comprising ferrous before introducing the oxygen-containing gas, and the aqueous suspension in the course of growing the goethite. It is especially preferable to add the compound of a rare earth element before the beginning of the growth reaction of the goethite. Alternatively, the compound of a rare earth element may be added partially in quantitative, continuously or intermittently.

The amount of compound of a rare earth element added after the synthesis of the goethite particles is 0.5 to 15 atm %, preferably 1.0 to 12.0 atm, (calculated as the rare earth element) based on the total Fe in the spindle-shaped goethite particles. If it is less than 0.5 atm %, the anti-sintering effect is not obtained an when the goethite particles are converted to magnetic iron based alloy particles, the S.F.D. (coercive force distribution) is deteriorated. If it exceeds 10 atm %, the compound of the rare earth element singly be precipitated, thereby causing drop-out when a sheet is produced by using such magnetic iron based alloy particles.

The amount of compound of a rare earth element added in the course of the growth reaction of the goethite particles is 0.5 to 10 atm %, preferably 1.0 to 6.0 atm % (calculated as the rare earth element) based on the total Fe in the spindle-shaped goethite particles. If it is less than 0.5 atm %, the anti-sintering effect is not obtained an when the goethite particles are converted to magnetic iron based alloy particles, the S.F.D. (coercive force distribution) is deteriorated. If it exceeds 10 atm %, the compound of the rare earth element singly be precipitated, thereby causing drop-out when a sheet is produced by using such magnetic iron based alloy particles.

The process for producing the spindle-shaped hematite particles according to the present invention will now be described.

In the present invention, the spindle-shaped goethite particles obtained are usually subjected to a surface coating treatment prior to the dehydration in order to prevent sintering. The surfaces of the goethite particles are coated with a compound of a rare earth element as an anti-sintering agent and, if necessary, a compound of another element.

As the compound of a rare earth element, at least one of the chlorides, sulfates and nitrates of scandium, yttrium, lanthanum, cerium, praseodymium, neodymium and samarium is preferably usable. The surface coating process may be either a dry process or a wet process, especially a wet coating process is preferable.

The amount of compound of the rare earth element used is 0.5 to 15 atm %, preferably 1.0 to 12.0 atm % (calculated as the rare earth element) based on the total Fe. If it is less than 0.5 atm %, the anti-sintering effect is not sufficient and when the magnetic iron based alloy particles are produced by using such goethite particles, the S.F.D. (coercive force distribution) may be deteriorated. If it exceeds 15 atm %, the saturation magnetization may be lowered.

In order to enhance the anti-sintering effect, at least one compound of Al, Si, B, Ca, Mg, Ba, Sr, etc. may be used, if necessary. Since these compounds have not only the anti-sintering effect but also the function of controlling the reduction rate, they may be used in combination as occasion demands. The total amount of the compound in this case is 1 to 15 atm % (calculated as the sum of the rare earth element and another element) based the spindle-shaped goethite particles. If the amount of compound of another element is too small, the anti-sintering effect may not be produced. If the amount is too large, the saturation magnetization may be lowered. The optimum amount is, therefore, selected in accordance with the type of compound combined.

By coating the particle surfaces with the anti-sintering agent previously, sintering between particles is prevented, so that spindle-shaped hematite particles which retain the particle shape and the aspect ratio of the spindle-shaped goethite particles can be obtained. This facilitates the production of individual spindle-shaped magnetic iron based alloy particles which retain the above-described particle shape, aspect ratio and the like. The spindle-shaped hematite particles are produced by heat the spindle-shaped goethite particles obtained in a non-reducing atmosphere in the temperature range of 400 to 850° C. The heating temperature can be appropriately selected so that the ratio $D_{104}/D_{110}$ of the X-ray crystallite size is maintained in a specific range defined in the present invention.

The process for producing the magnetic iron based alloy particles according to the present invention will now be explained.

(1) Production of Magnetic Iron Based Alloy Particles from the Spindle-shaped Goethite Particles In the present invention, the spindle-shaped goethite particles of the present invention are subjected to a surface coating treatment prior to heat treatment for reduction in order to prevent sintering between particles, to facilitated the retention of the particle shape and the aspect ratio, and the production of individual magnetic iron based alloy particles.

As the anti-sintering agent, at least one selected from the group consisting of the compounds of Al, Si, B, Ca, Mg, Ba, Sr and a rare earth elemeni such as Sc, Y and Nd may be used, as is well known. Since these compounds have not only the anti-sintering effect but also the function of controlling the reduction rate, they may be used in combination as occasion demands. If the total amount of compound is too small, the anti-sintering effect may not be produced. If it is too large, the saturation magnetization may be lowered. The optimum amount is, therefore, selected in accordance with the type of compound combined. The total amount is in the range of 1 to 15 atm % based on the total Fe of the spindle-shaped goethite particles.

Although it is possible to obtain the objective magnetic iron based alloy particles by reducing the spindle-shaped goethite particles coated with the compound as they are, it is preferable to heat the goethite particles in a non-reducing gas atmosphere prior to the reduction in order to control the magnetic properties, the particle properties and the particle shape.

The non-reducing gas atmosphere can at least be selected from the group consisting of air, oxygen gas, nitrogen gas and the like. The heating temperature is 300 to 850° C. It is preferable that the temperature is appropriately selected in accordance with the type of compound used for the surface-coating treatment of the spindle-shaped goethite particles. If the temperature exceeds 850° C., the shape of the particles is deformed, and the sintering between particles is caused.

The temperature for the heat treatment for reduction is preferably 300 to 600° C. If the temperature is lower than 300° C., the reduction rate is too slow, so that the reduction takes a long time. If the temperature exceeds 600° C., the reduction rate is too fast, so that the shape of the particles is deformed, and the sintering between particles is easily caused.

(2) Production of Magnetic Iron Based Alloy Particles from the Spindle-shaped Hematite Particles The spindle-shaped hematite particles obtained are reduced by heat treatment to produce magnetic iron based alloy particles.

The heat treatment for reduction is conducted by introducing a reducing gas such as hydrogen gas into a reactor in which the spindle-shaped hematite particles are charged. The reducing gas contains hydrogen gas and carbon monoxide gas. Among them, hydrogen gas is preferable.

The temperature for the heat treatment for reduction is preferably 400 to 600° C. If the temperature is lower than 400° C., the reduction rate is too slow, so that the reduction takes a long time. If the temperature exceeds 600° C., the reduction rate is too fast, so that the particles are deformed, and sintering between particles is caused.

The spindle-shaped magnetic iron based alloy particles after the reduction can be taken out into air by a known method. For example, the magnetic iron based alloy particles may be charged into an organic solvent such as toluene, or the atmosphere of the magnetic iron based alloy particles after the reduction may be temporarily replaced by an inert gas, and the oxygen contained in the inert gas is gradually increased up to air, finally.

In order to improve the shape and the like of goethite particles as precursor particles of magnetic iron based alloy particles, various metal salts have been added. Especially, Co is known to form a solid solution with iron in the magnetic iron based alloy particles, and to enhance the magnetization and the coercive force. Al is known to contribute to prevention of the sintering in magnetic iron based alloy particles and to be excellent in shape retention.

It is also known that when Co becomes a solid solution in the process of producing goethite particles, fine particles are obtained and goethite particles having an approximately large aspect ratio are obtained due to a small minor axial diameter. On the other hand, since the particles are extremely fine, it is difficult to obtain particles suitable for use. It is known that Al has a crystal growth controlling effect and that the aspect ratio is greatly different depending upon the timing of adding Al and the amount of Al added. For example, when an Al compound is added in the course of growth of the goethite particles, the aspect ratio be lowered. It has been found that if an Al compound and Co ions are co-exist simultaneously, the aspect ratio of the goethite particles is lowered extremely.

Further, it has been found that when the production of goethite particles is separated into two processes, i.e., the process of producing seed particles and the process of growth reaction, Co which shows the effect of appropriately increasing the aspect ratio is added in the process of producing seed particles so as to make a substitution of Co ion for Fe ion in the goethite seed particles in a crystal structure, and Al which shows an anti-sintering effect is added to the ferrous salt solution and the mixed aqueous alkali solution in the process of the growth reaction, when the solution contains no Co, so that Al is present only in the growth reaction, it is possible to produce particles having a necessary aspect ratio in the course of producing the seed Particles and to obtain spindle-shaped goethite particles having a large aspect ratio and retaining an appropriate particle shape in the course of growth reaction.

Since particles in which Co exists in the goethite seed particles in a crystal structure and Al exists in the goethite layer as same as Co are used for precursor particles, it is possible to produce spindle-shaped magnetic iron based alloy particles having a narrow particle size distribution, including no dendrites, having appropriate particle shape and aspect ratio, and having a high coercive force and an excellent coercive force distribution.

When a rare earth element exists in the surface layer, since the minor axial diameter of the goethite particles obtained becomes slightly large, the aspect ratio is lowered.

It is known that as the aspect ratio becomes larger, the coercive force of the magnetic iron based alloy particles generally becomes higher. On the other hand, if a rare earth element is contained in the surface layer, the aspect ratio of the goethite particles becomes small, as described above. However, the goethite particles having a rare earth element in the surface layers have a higher coercive force than the goethite particles obtained by using a rare earth element only as an anti-sintering agent. This is considered due to the difference in the state In which a rare earth element exists.

In addition, by adding a rare earth element together with an Al compound in the course of growing the goethite layer, it is possible to prevent sintering during reducing the heated spindle-shaped goethite particles so as to produce spindle-shaped magnetic iron based alloy particles therefrom and to improve the S.F.D. (coercive force distribution) when a sheet is produced by using such magnetic iron based alloy particles.

Furthermore, it has been found that when the ratio $D_{104}/D_{110}$ of the X-ray crystallite size in the spindle-shaped hematite particles obtained by subjecting the spindle-shaped goethite particles to anti-sintering treatment by using an anti-sintering agent of the rare earth element, etc., and dehydrating the thus-treated spindle-shaped goethite particles is in specific range, the S.F.D. (coercive force distribution) of a sheet produced by using such the magnetic iron based alloy particles produced by heat-treating the hematite particles is improved.

When a rare earth element is used as an anti-sintering agent for the spindle-shaped goethite particles, it is to easily obtain the ratio $D_{104}/D_{110}$ of 0.2 to 0.65 of the X-ray crystallite size of the spindle-shaped hematite particles obtained by appropriately selecting the dehydration temperature, and when a sheet is produced by using such magnetic iron based alloy particles obtained by heat-treating these hematite particles, the S.F.D. (coercive force distribution) is improved.

On the other hand, even if a rare earth element is used as an anti-sintering agent, when the ratio $D_{104}/D_{110}$ of the X-ray crystallite size of the hematite particles is out of the specific range, the S.F.D. (coercive force distribution) of the magnetic iron based alloy particles produced by heat-treating these hematite particles is not sufficient.

The spindle-shaped goethite particles of the first aspect according to the present invention preferably have the following properties.

(1) Average major axial diameter: 0.05 to 1.0 μm, preferably 0.05 to 0.5 μm (2) Aspect ratio: 10 to 15, preferably 13 to 15

(3) BET specific surface area: 50 to 180 m²/g, preferably 60 to 150 m²/g (4) Co content (Co/Fe): 0.5 to 25 atm %, preferably 1.0 to 20 atm %

(5) Al content (Al/Fe): 0.5 to 15 atm %, preferably 1.0 to 10 atm %

(6) Rare earth element content (rare earth element/Fe): 0 atm %

(7) Particle size distribution: not more than 0.25, preferably not more than 0.23

The spindle-shaped goethite particles of the second aspect according to the present invention preferably have the following properties.

(1) Average major axial diameter: 0.05 to 1.0 μm, preferably 0.05 to 0.5 μm
(2) Aspect ratio: 10 to 15, preferably 13 to 15
(3) BET specific surface area: 50 to 180 m$^2$/g, preferably 60 to 150 m$^2$/g
(4) Co content (Co/Fe): 0.5 to 25 atm %, preferably 1.0 to 20 atm %
(5) Al content (Al/Fe): 0.5 to 15 atm %, preferably 1.0 to 10 atm %
(6) Rare earth element content (rare earth element/Fe): 0.5 to 15 atm %, preferably 1.0 to 12 atm %
(7) Particle size distribution: not more than 0.25, preferably not more than 0.23

The spindle-shaped goethite particles of the third aspect according to the present invention preferably have the following properties.

(1) Average major axial diameter: 0.05 to 1.0 μm, preferably 0.05 to 0.5 μm
(2) Aspect ratio: 10 to 14, preferably 11 to 14
(3) BET specific surface area: 50 to 180 m$^2$/g, preferably 60 to 150 m$^2$/g
(4) Co content (Co/Fe): 0.5 to 25 atm %, preferably 1.0 to 20 atm %
(5) Al content (Al/Fe): 0.5 to 15 atm %, preferably 1.0 to 10 atm %
(6) Rare earth element content (rare earth element/Fe): 0.5 to 10 atm %, preferably 1.0 to 8 atm %
(7) Particle size distribution: not more than 0.24, preferably not more than 0.22

The spindle-shaped hematite particles of the fifth aspect according to the present invention preferably have the following properties.

(1) Average major axial diameter: 0.05 to 1.0 μm, preferably 0.05 to 0.5 μm
(2) Aspect ratio: 10 to 15, preferably 11 to 15
(3) BET specific surface area: 25 to 140 m$^2$/g, preferably 30 to 100 m$^2$/g
(4) Co content (Co/Fe): 0.5 to 25 atm %, preferably 1.0 to 20 atm %
(5) Al content (Al/Fe): 0.5 to 15 atm %, preferably 1.0 to 10 atm %
(6) Rare earth element content (rare earth element/Fe): 0 atm %
(7) Ratio $D_{104}/D_{110}$: 0.20 to 0.65, preferably when $0.5 \leq x \leq 10$, $0.500-0.03x \leq D_{104}/D_{110} \leq 0.665-0.03x$; when $10 < x \leq 15$, $0.20 \leq D_{104}/D_{110} \leq 0.365$.
(8) X-ray crystallite size $D_{104}$: 40 to 200 Å, preferably 100 to 170 Å
(9) Particle size distribution: not more than 0.30, preferably not more than 0.27

The spindle-shaped hematite particles of the sixth aspect according to the present invention preferably have the following properties.

(1) Average major axial diameter: 0.05 to 1.0 μm, preferably 0.05 to 0.5 μm
(2) Aspect ratio: 10 to 15, preferably 11 to 15
(3) BET specific surface area: 30 to 140 m$^2$/g, preferably 35 to 100 m$^2$/g
(4) Co content (Co/Fe): 0.5 to 25 atm %, preferably 1.0 to 20 atm %
(5) Al content (Al/Fe): 0.5 to 15 atm %, preferably 1.0 to 10 atm %
(6) Rare earth element content (rare earth element/Fe): 0.5 to 15 atm %, preferably 1.0 to 12 atm %
(7) Ratio $D_{104}/D_{110}$: 0.20 to 0.65, preferably when $0.5 \leq x \leq 10$, $0.500-0.03x < D_{104}/D_{110} \leq 0.665 -0.03x$; when $10 < x \leq 15$, $0.20 < D_{104}/D_{110} \leq 0.365$.
(8) X-ray crystallite size $D_{104}$: 40 to 200 Å, preferably 100 to 170 Å
(9) Particle size distribution: not more than 0.28, preferably not more than 0.25

The spindle-shaped hematite particles of the seventh aspect according to the present invention preferably have the following properties.

(1) Average major axial diameter: 0.05 to 1.0 μm, preferably 0.05 to 0.5 μm
(2) Aspect ratio: 10 to 14, preferably 11 to 14
(3) BET specific surface area: 30 to 180 m$^2$/g, preferably 35 to 100 m$^2$/g
(4) Co content (Co/Fe): 0.5 to 25 atm %, preferably 1.0 to 20 atm %
(5) Al content (Al/Fe): 0.5 to 15 atm %, preferably 1.0 to 10 atm %
(6) Rare earth element content (rare earth element/Fe): 0.5 to 15 atm %, preferably 1.0 to 12 atm %
(7) Ratio $D_{104}/D_{110}$: 0.20 to 0.65, preferably when $0.5 \leq x \leq 10$, $0.500-0.03x \leq D_{104}/D_{110} \leq 0.665-0.03x$; when $10 < x \leq 15$, $0.20 < D_{104}/D_{110} \leq 0.365$.
(8) X-ray crystallite size $D_{104}$: 40 to 200 Å, preferably 100 to 170 Å
(9) Particle size distribution: not more than 0.26, preferably not more than 0.24

The spindle-shaped magnetic iron based alloy par Aches of the eleventh aspect according to the present invention preferably have the following properties.

(1) Average major axial diameter: 0.05 to 0.5 μm, preferably 0.06 to 0.3 μm.
(2) Aspect ratio: not less than 9, preferably not less than 9.5
(3) BET specific surface area: 30 to 80 m$^2$/g, preferably 35 to 60 m$^2$/g
(4) Co content (Co/Fe): 0.5 to 25 atm %, preferably 1.0 to 20 atm %
(5) Al content (Al/Fe): 0.5 to 15 atm %, preferably 1.0 to 10 atm %
(6) Fare earth element content (rare earth element/Fe): 0.5 to 15 atm %, preferably 1.0 to 12 atm %
(7) X-ray crystallite size $D_{110}$: 100 to 250 Å,
(8) Coercive force: 1200 to 2200 Oe, preferably 1500 to 2000 Oe
(9) Saturation magnetization: not less than 100 emu/g, preferably not less than 110 emu/g
(10) Squareness: not less than 0.75, preferably not less than 0.80
(11) S.F.D. in sheet: not more than 0.5, preferably not more than 0.45
(12) Particle size distribution: not more than 0.35, preferably not more than 0.30

The spindle-shaped magnetic iron based alloy particles of the twelfth aspect according to the present invention preferably have the following properties.

(1) Average major axial diameter: 0.05 to 0.5 µm, preferably 0.06 to 0.3 µm
(2) Aspect ratio: not less than 9, preferably not less than 9.5
(3) BET specific surface area: 30 to 80 m$^2$/g, preferably 35 to 60 m$^2$/g
(4) Co content (Co/Fe): 0.5 to 25 atm %, preferably 1.0 to 20 atm %
(5) Al content (Al/Fe): 0.5 to 15 atm %, preferably 1.0 to 10 atm %
(6) Rare earth element content (rare earth element/Fe): 0.5 to 15 atm %, preferably 1.0 to 12 atm %
(7) X-ray crystallite size $D_{110}$: 100 to 250 Å, preferably 100 to 200 Å
(8) Coercive force: 1200 to 2200 Oe, preferably 1500 to 2000 Oe
(9) Saturation magnetization: not less than 100 emu/g, preferably not less than 110 emu/g
(10) Squareness: not less than 0.75, preferably not less than 0.80
(11) S.F.D. in sheet: not more than 0.47, preferably not more than 0.44
(12) Particle size distribution: not more than 0.33, preferably not more than 0.28

The spindle-shaped magnetic iron based alloy particles of the thirteenth aspect according to the present invention preferably have the following properties.

(1) Average major axial diameter: 0.05 to 0.5 µm, preferably 0.06 to 0.5 µm
(2) Aspect ratio: not less than 8.5, preferably not less than 9.0
(3) BET specific surface area: 30 to 80 m$^2$/g, preferably 35 to 60 m$^2$/g
(4) Co content (Co/Fe): 0.5 to 25 atm %, preferably 1.0 to 20 atm %
(5) Al content (Al/Fe): 0.5 to 15 atm %, preferably 1.0 to 10 atm %
(6) Rare earth element content (rare earth element/Fe): 0.5 to 10 atm %, preferably 1.0 to 6.0 atm %
(7) X-ray crystallite size $D_{110}$: 100 to 250 Å,
(8) Coercive force: 1400 to 2200 Oe, preferably 1600 to 2100 Oe
(9) Saturation magnetization: not less than 110 emu/g, preferably not less than 120 emu/g
(10) Squareness: not less than 0.73, preferably not less than 0.82
(11) S.F.D. in sheet: not more than 0.455, preferably not more than 0.42
(12) Particle size distribution: not more than 0.31, preferably not more than 0.26

The spindle-shaped goethite particles and the spindle-shaped hematite particles according to the present invention have a narrow particle size distribution, include no dendrites, and have appropriate particle shape and aspect ratio, so that the spindle-shaped magnetic iron based alloy particles produced from the spindle-shaped goethite particles or the spindle-shaped hematite particles also have a narrow particle size distribution, include no dendrites, and have appropriate particle shape and aspect ratio. Therefore, the magnetic iron based alloy particles have a high coercive force and a high coercive force distribution, and the magnetic iron based alloy particles are suitable as the magnetic particles for magnetic media having high recording density, high sensitivity and high output.

EXAMPLES

The present invention will now be described in more detail with reference to the following examples and comparative examples, but the present invention is not restricted to those examples and various modifications are possible within the scope of the invention.

The properties in the examples were measured by the following methods.

(1) Average Major Axial Diameter and the Average Minor Axial Diameter

The average major axial diameter and the average minor axial diameter of the particles are measured by electron microphotographs.

(2) Specific Surface Area

The specific surface area is measured by a BET method using "Monosorb Ms-11" Manufactured by Quantachrome Corp.).

(3) X-ray Crystallite Size

The ($D_{110}$ and $D_{104}$ of hematite particles and $D_{110}$ of magnetic iron based alloy particles) represents the size of a crystal grain measured by X-ray diffractometry and is expressed by a thickness of the crystal grain in the direction perpendicular to the crystal face (104) or (110) in the case of hematite particles and to the crystal face (110) in the case of magnetic iron based alloy particles. The measured value was calculated from the diffraction peak curve of each crystal face by using the following Scherrer formula:

$$D_{104} \text{ or } D_{110} = K\lambda/\beta\cos\theta$$

wherein

β=the half-width of the real difraction peak (radian unit) obtained by correcting the machine width of the apparatus, K=Scherrer constant (0.9), λ=the wavelength of X-ray (Fe Kα-ray 1.935 nm), θ=a diffraction angle (corresponding crystal face (104) and the crystal face (110).

(4) Magnetic Properties

The magnetic properties of the magnetic iron based alloy particles were measured under an external magnetic field of 10 kOe by "Vibration Sample Magnetometer VSM-3S-15" (manufactured by Toei Kogyo, Co., Ltd.).

(4-1) Magnetic Properties of Sheet

In order to produce a sheet-like sample, a magnetic coating was prepared by mixing and dispersing the following materials in a 100-cc glass bottle for 8 hours by a paint shaker (manufactured by Red Devil Co., Ltd.). The magnetic coating was applied to polyethylene terephthalate film having a thickness of 25 µm to a thickness of 50 µm by an applicator, and the film was then dried in a magnetic field of 5 KGauss.

| | |
|---|---|
| Steel ball 3 mm in diameter | 800 parts by weight |
| Magnetic iron based alloy particles | 100 parts by weight |
| Polyurethane resin having a sodium sulfonate group | 20 parts by weight |
| Cyclohexanone | 83.3 parts by weight |
| Methylethyl ketone | 83.3 parts by weight |
| Toluene | 83.3 parts by weight |

The magnetic properties of the sheet obtained were measured.

(5) Co Content, Al Content and the Content of Another Metal Element

The Co content, Al content and the content of another metal element in the spindle-shaped goethite particles, spindle-shaped hematite particles and spindle-shaped magnetic iron based alloy particles were measured by "Inductively Coupled Plasma Emission Spectrophotometer SPS4000" (manufactured by Seiko Instruments" and Electronics, Ltd.).

(6) Particle Size Distribution of the particles is expressed by the ratio of a standard deviation to the average major axis diameter.

The major axis diameters of 300 particles in an electron microphotograph (×200,000 magnification) were measured. The actual major axial diameters and the number of the particles were obtained from the calculation on the basis of the measured values.

The standard deviation (s) was obtained by the following equation.

$$s = \sqrt{\sum_{i=1}^{n} (x_1 - \bar{x})^2 / n}$$

wherein $x_1, x_2, \ldots, x_n$ represent the determined major axis diameter of the each specimen, $\bar{x}$ represents an average major axis diameter determined of the each specimen.

Example 1
<Production of Spindle-shaped Goethite Particles>

A mixed solution was prepared in a reaction vessel into which $N_2$ gas was introduced (blown) so as to form a non-oxidizing atmosphere, by adding 32.0 liters of 0.374-N aqueous NaOH solution (the ratio of NaOH is 33.3 mol % based on the mixed alkali) to 3.7 liters of 6.5-N aqueous $Na_2CO_3$ solution. 13.3 liters of aqueous ferrous sulfate solution containing 1.5 mol/liter of $Fe^{2+}$ (the aqueous alkali solution corresponds to 1.5 equivalents based on the ferrous sulfate) was then added to the mixed solution and the temperature of the obtained suspension was raised to 47° C. and maintained the same temperature for 200 minutes. Thereafter, 281 g of cobalt sulfate (4 atm % (calculated as Co) based on the total Fe both in the course of producing seed particles and in the course of the growth reaction) which was dissolved in 1 liter of purified water was added to the suspension, and the suspension was stirred and mixed. After aging the suspension by maintaining it at pH 9.5 in the no-oxidizing atmosphere for 100 minutes, air was introduced into the suspension for 6.0 hours at a rate of 70 liters per minute at 47° C., thereby producing spindle-shaped goethite seed particles.

A part of the slurry containing the spindle-shaped goethite seed particles for measurement was discharged. The spindle-shaped goethite seed particles obtained through filtration, washing with purified water and drying at a temperature of 120° C., had an average axial diameter of 0.24 μm (from an electron micrograph (×30000) of FIG. 1), an aspect ratio of 12, and a BET specific surface area of 83 m²/g. No dendrites were included in the particles and the particle size distribution was narrow. After the spindle-shaped goethite seed particles of the slurry was separated out by the solid-liquid separation, the Co content in the solution was analyzed, As a result, no Co ion was detected in the filtrate. Further, 100% of the Co ions added were adsorbed to the goethite seed particles.

A mixed solution was prepared in the reaction vessel into which $N_2$ gas was introduced so as to form a non-oxidizing atmosphere, by adding 0.67 liters of 3.0-N aqueous NaOH solution (the ratio of NaOH is 33.3 mol % based on the mixed alkali) to 1.23 liters of 6.5-N aqueous $Na_2CO_3$ solution. The mixed solution and 6.7 liters of aqueous ferrous sulfate solution containing 1.5 mol/liter of $Fe^{2+}$ (the aqueous alkali solution corresponds to 1.5 equivalents based on the ferrous sulfate) were added to the suspension containing the spindle-shaped goethite seed particles and the temperature of the resultant suspension was raised to 50° C. and maintained at the same temperature for 20 minutes. At a pH of 9.6 (the difference in the pH between the process of producing the goethite seed particles and this process is 0.1), 243 g (equivalent to 3.0 atm % (calculated as Al) based on the total Fe) of sodium aluminate ($A_2O_3$ content was 19 wt %) was added to the resultant suspension. The suspension was stirred, mixed and aged. Thereafter, air was introduced into the suspension for 2.0 hours at a rate of 150 liters per minute at 50° C., thereby growing the goethite.

Figure 2:
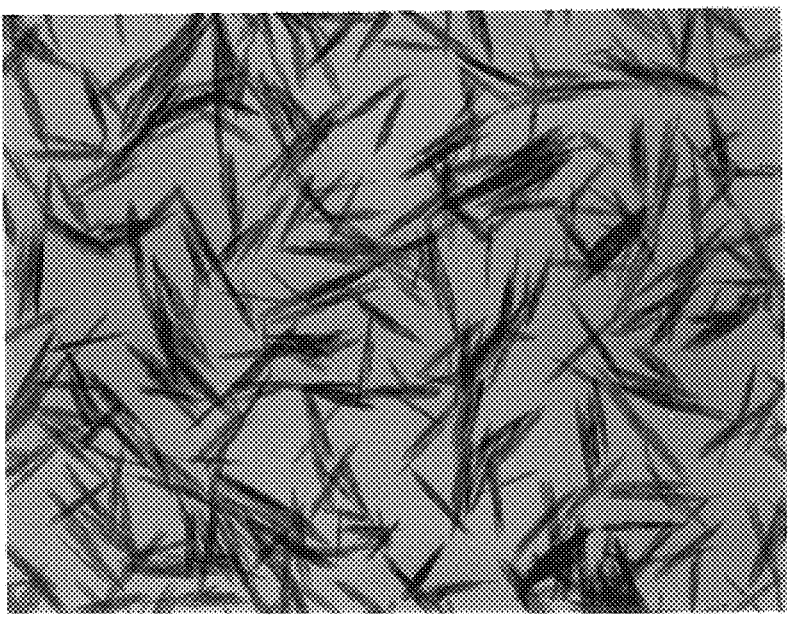
FIG. 2 is an electron micrograph (×30000) of the structure of spindle-shaped goethite particles obtained in Example 1 of the present invention.

After the completion of the growth reaction, the particles were filtered out, washing with purified water, drying at a temperature of 120° C. and crushed by a roller. The spindle-shaped goethite particles obtained had an average axial diameter of 0.28 μm (from an electron micrograph (×30000) of FIG. 2), an aspect ratio of 13, a BET specific surface area of 97 m²/g and a particle size distribution of 0.19. No dendrites were included in the particles and the particle size distribution was narrow. The goethite particles contained 4.0 atm % of Co (calculated as Co) based on the total Fe and 3.0 atm % of Al (calculated as Al) based on the total Fe.

Example 2
<Production of Spindle-shaped Hematite Particles>

The cake containing 500 g (5.01 mol calculated as Fe) of the spindle-shaped goethite particles obtained in Example 1 was suspended in 8 liters of water. The pH of the suspension was 7.9. Thereafter, 75.1 g of $Al(NO_3)_3 \cdot 9H_2O$ (equivalent to 4.0 atm % (calculated as Al) based on the total Fe in the goethite particles) was added to the suspension. After the suspension was stirred for 10 minutes, 55.1 ml (equivalent to 2.2 (calculated as Nd) based on the total Fe in the goethite particles) of aqueous neodymium nitrate solution of 2 mol/liter was further added to the suspension and the suspension was stirred for 10 minutes.

The pH of the suspension was adjusted to 9.5 by adding an aqueous sodium hydrate, and purified water was added until the total amount of the suspension was 10 liter. After the suspension was stirred for 10 minutes, it was filtered by a filter press. The obtained material was washing with purified water, and drying at a temperature of 120° C. to obtain goethite particles coated with an Al compound and a Nd compound. In the goethite particles, the Co content was 4.0 atm %, the Al content was 7.0 atm % and the Nd content was 2.2 atm %, respectively, based on the total Fe.

400 g of the spindle-shaped goethite particles coated with the Al compound and the Nd compound obtained was heated to 750° C. in the air, and spindle-shaped hematite particles coated with the Al compound and the Nd compound were obtained.

The spindle-shaped hematite particles obtained had an average axial diameter of 0.26 μm (from an electron micrograph (×30000), an aspect ratio of 12.7, a BET specific surface area of 43.1 m²/g and a particle size distribution of 0.23. The X-ray crystallite size $D_{104}$ was 13.1 nm, $D_{110}$ was 25.6 nm, and the ratio $D_{104}/D_{110}$ was 0.51. In the hematite particles, the Co content was 4.0 atm %, the Al content was 7.0 atm % and the Nd content was 2.2 atm %, respectively, based on the total Fe.

Example 3
<Production of Magnetic Iron Based Alloy Particles>

100 g of the spindle-shaped hematite particles coated with the Al compound and the Nd compound obtained in Example 2 were charged into a fixed-bed reactor of 72 mm in inner diameter, and $H_2$ gas was introduced into the reactor at a rate of 35 liters per minute so that the hematite particles were reduced at 500° C.

First, only nitrogen gas was introduced into the reactor so as to prevent the rapid oxidation of the magnetic iron based alloy particles containing Co, Al and Nd obtained by the reduction. Thereafter a mixed gas of nitrogen gas and very small amount of air was introduced with the ratio of air gradually increased with time so as to form a stable oxide layer on the surfaces.

Figure 3:
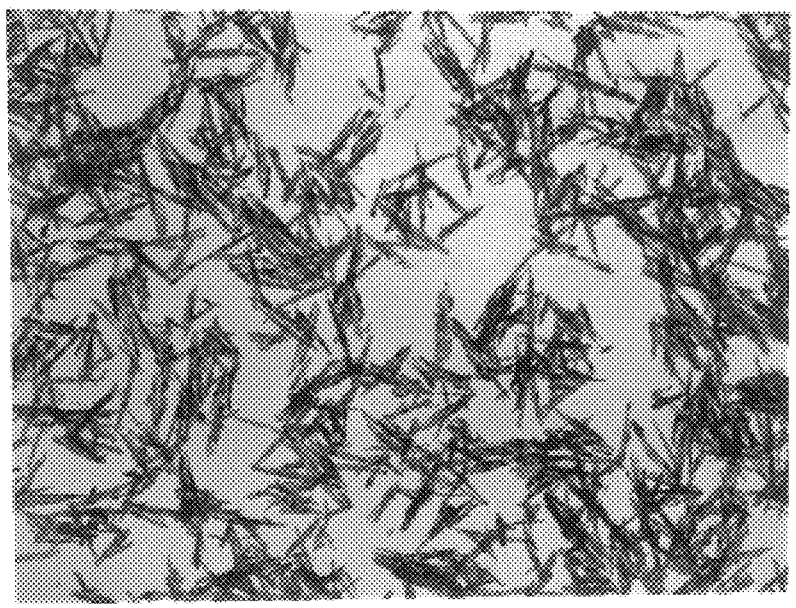
FIG. 3 is an electron micrograph (×30000) of the structure of spindle-shaped magnetic iron based alloy particles obtained in Example 3 of the present invention.
Figure 4:
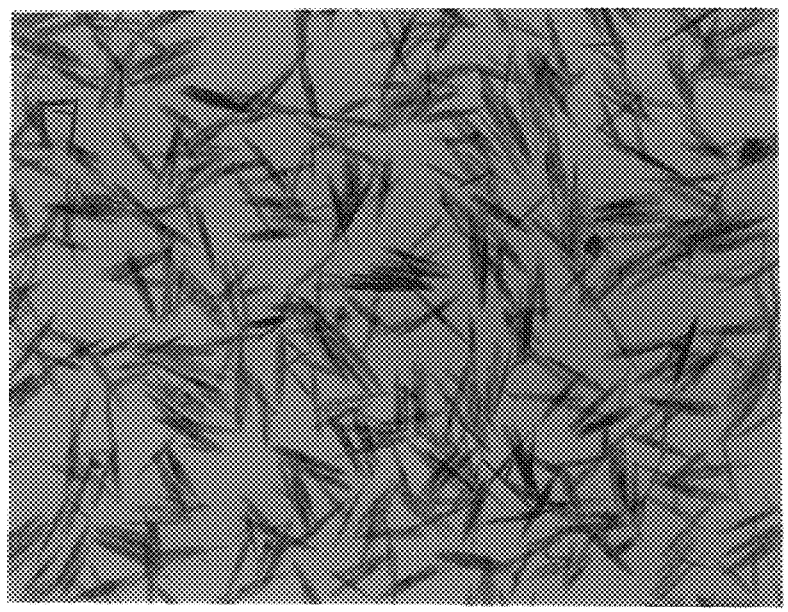
FIG. 4 is an electron micrograph (×30000) of the structure of the spindle-shaped goethite seed particles in Example 4.
Figure 5:
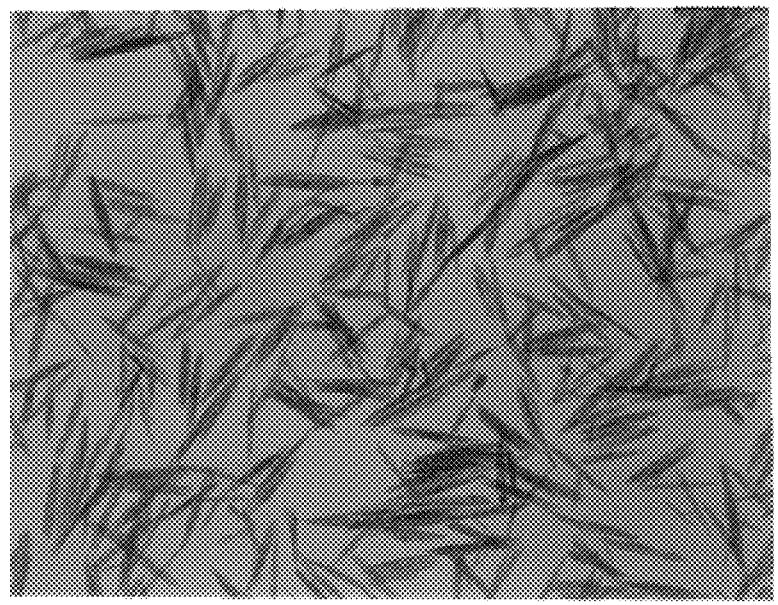
FIG. 5 is an electron micrograph (×30000) of the structure of the spindle-shaped goethite particles obtained in Example 4.
Figure 6:
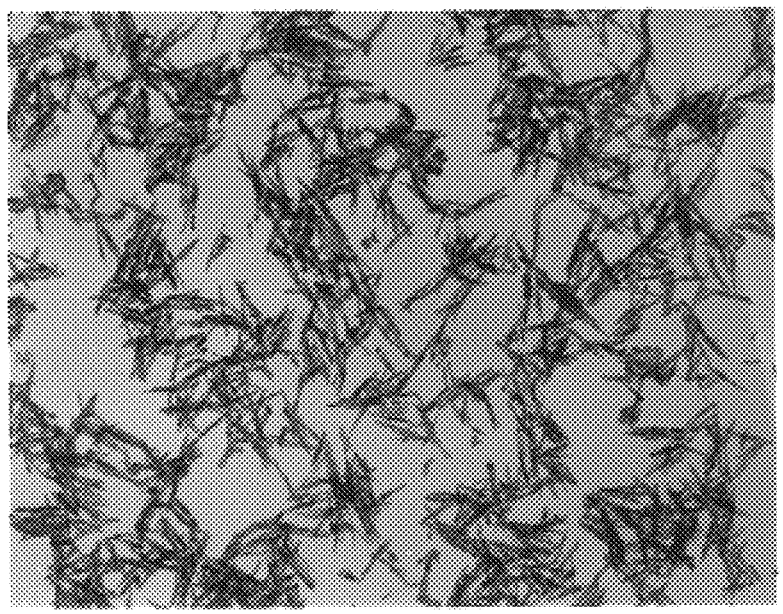
FIG. 6 is an electron micrograph (×30000) of the structure of the magnetic iron based alloy particles obtained in Example 9 according to the present invention.
Figure 7:
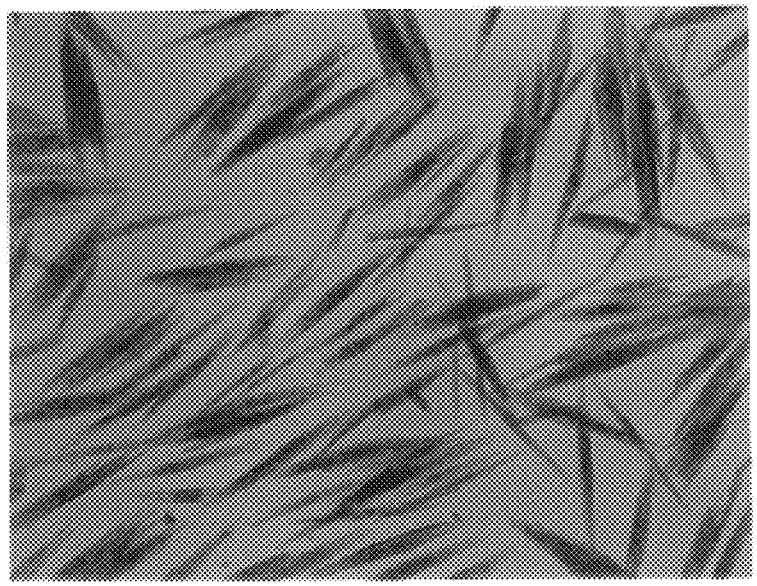
FIG. 7 is an electron micrograph (×30000) of the spindle shaped goethite seed particles in Comparative Example 3.
Figure 8:
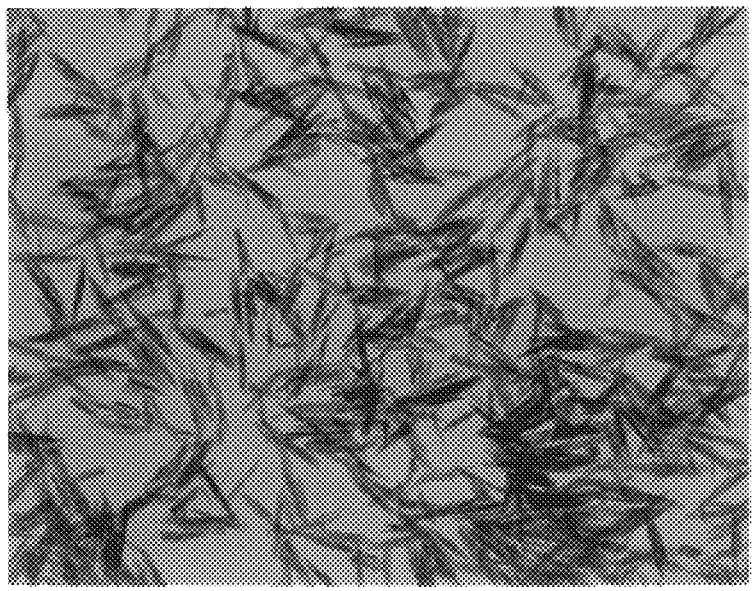
FIG. 8 is an electron micrograph (×30000) of the 2.
Figure 9:
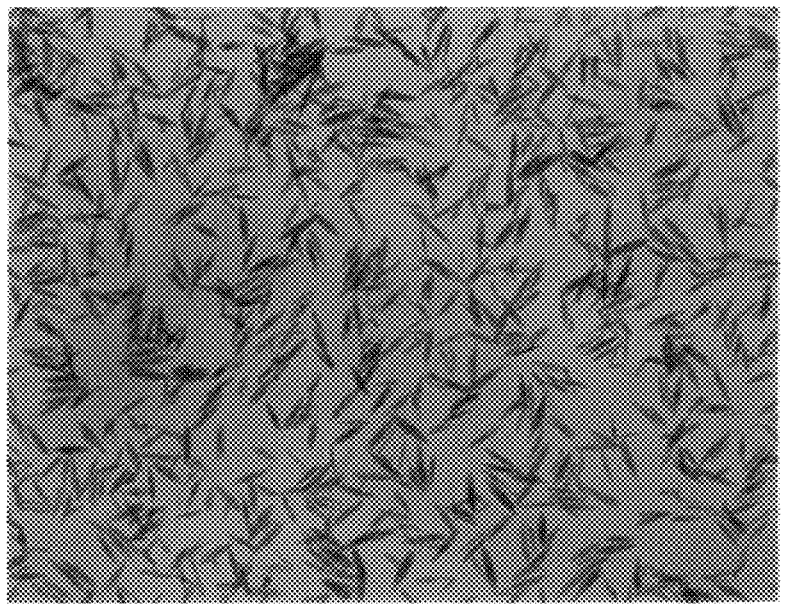
FIG. 9 is an electron micrograph (×30000) of the spindle shaped goethite seed particles in Comparative Example 3.
Figure 10:
FIG. 10 is an electron micrograph (×30000) of the spindle shaped goethite seed particles in Comparative Example 4.

The magnetic iron based alloy particles containing Co, Al and Nd obtained had an average axial diameter of 0.17 μm (from an electron micrograph (×30000) of FIG. 3), an aspect ratio of 10, a BET specific surface area of 43 m²/g and a particle size distribution of 0.25. The X-ray crystallize size $D_{110}$ was 16.2 nm. The particles has a spindle shape and a narrow particle size distribution, and included few dendrites. In the particles, the Co content was 4.0 atm %, the Al content was 7.0 atm % and the Nd content was 2.2 atm %, respectively, based on the total Fe. As to the magnetic properties of the magnetic iron based alloy particles, the coercive force Hc was 1730 Oe, the saturation magnetization σs was 147.3 emu/g, and the Squareness (Br/Bm) was 0.510. When a sheet was produced by using the obtained magnetic iron based alloy particles, the coercive force Hc was 1780 Oe, the Squareness (Br/Bm) was 0.858, and the S.F.D. was 0.443.

Examples 4 to 8, Comparative Example 1
<Production of Spindle-shaped Goethite Particles>

Spindle-shaped goethite particles were produced in the same way as in Example 1 except for varying the conditions for producing spindle-shaped goethite seed particles as shown in Table 1 and the conditions for growing the goethite as shown in Table 2. Various properties of the goethite seed particles discharged are shown in Table 3, and various properties of the spindle-shaped goethite particles produced are shown in Table 3.

Comparative Example 2

Goethite particles containing Co were produced in the same way as the production of the goethite seed particles in Example 1. The obtained particles were filtered, washing with purified water, drying at a temperature of 120° C. and crushed by a roller, thereby obtaining goethite particles.

Comparative Example 3

Goethite particles containing Co and Al were produced in the same way as the production of the goethite seed particles in Example 1 except for adding an aqueous sodium aluminate to the aqueous ferrous sulfate in advance. The obtained particles were filtered, washing with purified water, drying a. a temperature of 120° C. and crushed by a roller, thereby obtaining goethite particles.

Comparative Example 4

Goethite particles were produced in the same way as the production of the goethite seed particles in Example 1 except for adding an aqueous sodium aluminate to the suspension when the oxidation degree was 40%. The obtained particles were filtered out, washing with purified water, drying at a temperature of 120° C. and crushed by a roller, thereby obtaining goethite particles. After a small amount of the slurry just before the addition of the aqueous sodium aluminate was discharged, and the solution and the obtained solid material was separated out by filtration, the Co content in the solution was analyzed. As a result, 3.3% of Co ions based on the Co added was detected in the solution.

Examples 9 to 13, Comparative Examples 5 to 8
<Production of Magnetic Iron Based Alloy Particles>

Spindle shaped hematite particles were produced in the same way as in Example 2 except for varying the kind of spindle-shaped goethite particles as the precursor, the kind and amount of coating material used as the anti-sintering agent, the dehydration temperature Magnetic iron based alloy particles were produced in the same way as in Example 3 except for varying the type of particles as precursor particles and the temperature for the heat treatment for reduction. The conditions for production and various properties of the magnetic iron based alloy particles obtained are shown in Table 4 and 5, respectively.

Example 14
<Production of Spindle-shaped Goethite Particles>

A mixed solution was prepared In a reaction vessel into which $N_2$ gas was introduced so as to form a non-oxidizing atmosphere, by adding 32.0 liters of 0.374-N aqueous NaOH solution (NaOH is equivalent to 33.3 mol % based on the mixed alkali) to 3.7 liters of 6.5-N aqueous $Na_2CO_3$ solution. 13.3 liters of aqueous ferrous sulfate solution containing 1.5 mol/liter of $Fe^{2+}$ (the aqueous alkali solution corresponds to 1.5 equivalents based on the ferrous sulfate) was then added to the mixed solution and the temperature of the obtained suspension was raised to 47° C. and maintained the same temperature for 130 minutes. Thereafter, 396 g of cobalt sulfate (7 atm % (calculated as Co) based on the total Fe in the process of producing seed particles and 4.7 atm % (calculated as Co) based on the total Fe in the process of producing seed particles and the process of the growth reaction) which was dissolved in 1 liter of purified water was added to the suspension, and the suspension was stirred and mixed. After aging the suspension by maintaining it at pH 9.5 in the non-oxidizing atmosphere for 170 minutes, air was introduced into the suspension for 6.0 hours at a rate of 70 liters per minute at 47° C., thereby producing spindle-shaped goethite seed particles.

A part of the slurry containing the spindle-shaped goethite seed particles for measurement was discharged. The spindle-shaped goethite seed particles obtained through filtration, washing with purified water and drying at a temperature of 120° C. had an average axial diameter of 0.27 μm (from an electron micrograph (×30000)), an aspect ratio of 13, and a BET specific surface area of 81 m²/g. No dendrites were included in the particles and the particle size distribution was narrow. After the spindle-shaped goethite seed particles of the slurry was separated out by the solid-liquid separation, the Co content in the solution was analyzed, As a result, no Co ion was detected in the filtrate. Further, the spindle-shaped goethite seed particles contained 7 atm % (equivalent to 4.7 atm % (calculated as Co) based on the total Fe in the goethite particles after the growth reaction) of Co calculated as Co based on the total Fe in the seed particles. That is, 100% of the Co ions added were adsorbed.

A mixed solution was prepared in the reaction vessel into which $N_2$ gas was introduced so as to form a non-oxidizing atmosphere, by adding 2.0 liters of 3.0-N aqueous NaOH solution (the ratio of NaCH is 33.3 mol % based on the mixed alkali) to 1.85 liters of 6.5-N aqueous $Na_2CO_3$ solution. The mixed solution and 6.66 liters of aqueous ferrous sulfate solution containing 1.5 mol/liter of $Fe^{2+}$ (the aqueous alkali solution corresponds to 1.5 equivalents based on the ferrous sulfate) were added to the suspension containing the spindle-shaped goethite seed particles and the temperature of the resultant suspension was raised to 47° C. and maintained at the same temperature for 20 minutes. At a pH of 9.6 (the difference in the pH between the process of producing the goethite seed particles and this process is 0.1), 483 g (equivalent to 6.0 atm % (calculated as Al) based on the total Fe) of sodium aluminate ($Al_2O_3$ content was 19 wt %) was added to the resultant suspension. The suspension was stirred, mixed and aged. Thereafter, air was introduced into the suspension for 2.0 hours at a rate of 150 liters per minute at 50° C., thereby growing the goethite.

After the completion of the growth reaction, the particles were filtered out, washing with purified water, drying at a temperature of 120° C. and crushed by a roller. The spindle-shaped goethite particles obtained had an average axial diameter of 0.28 μm (from an electron micrograph (×30000)), an aspect ratio of 13.5, a BET specific surface area of 95 m²/g and a particle size distribution of 0.22. No dendrites were included in the particles and the particle size distribution was narrow. The goethite particles contained 4.7 atm % of Co (calculated as Co) based on the total Fe and 6.0 atm % of Al (calculated as Al) based on the total Fe.

Example 15
<Production of Spindle-shaped Hematite Particles>

The cake containing 2500 g (25.1 mol calculated as Fe) of the spindle-shaped goethite particles obtained in Example 14 was suspended in 40 liters of water. The pH of the suspension was 7.9. Thereafter, 281.5 g of $Al(NO_3) \cdot 9H_2O$ (equivalent to 3.0 atm % (calculated as Al) based on the total Fe in the goethite particles) was added to the suspension. After the suspension was stirred for 10 minutes, 375.5 ml (equivalent to 3.0 (calculated as Nd) based on the total Fe in the goethite particles) of aqueous neodymium nitrate solution of 2 mol/liter was further added to the suspension and the suspension was stirred for 10 minutes.

The pH of the suspension was adjusted to 9.5 by adding an aqueous sodium hydrate, and purified water was added until the total amount of the suspension was 50 liter. After the suspension was stirred for 10 minutes, it was filtered by a filter press. The obtained material was washing with purified water, passed through a granulation sieve of 4-mm meshes, and drying at a temperature of 120° C. to obtain goethite particles coated with an Al compound and a Nd compound. In the goethite particles, the Co content was 4.7 atm %, the Al content was 9.0 atm % and the Nd content was 3.0 atm %, respectively, based on the total Fe.

400 g of the spindle-shaped goethite particles coated with the Al compound and the Nd compound obtained was heated to 770° C. in the air, and spindle-shaped hematite particles coated with the Al compound and the Nd compound were obtained.

The spindle-shaped hematite particles obtained had an average axial diameter of 0.25 μm (from an electron micrograph (×30000)), an aspect ratio of 12.6, a BET specific surface area of 41.1 m²/g and a particle size distribution of 0.25. The X-ray crystallite size $D_{104}$ was 12.8 nm, $D_{110}$ was 25.7 nm, and the ratio $D_{104}/D_{110}$ was 0.50. In the hematite particles, the Co content was 4.7 atm %, the Al content was 9.0 atm % and the Nd content was 3.0 atm %, respectively, based on the total Fe.

Example 16
<Production of Magnetic Iron Based Alloy Particles>

100 g of the spindle-shaped hematite particles coated with the Al compound and the Nd compound obtained in Example 15 were charged into a fixed-bed reactor of 72 mm in inner diameter, and $H_2$ gas was introduced into the reactor at a rate of 35 liters per minute so that the hematite particles were reduced at 500° C.

First, only nitrogen gas was introduced into the reactor so as to prevent the rapid oxidation of the magnetic iron based alloy particles and further containing Co, Al and Nd obtained by the reduction. Thereafter a mixed gas of nitrogen gas and small amount so air was introduced with the ratio of air gradually increased with time so as to form a stable oxide layer on the surfaces.

The magnetic iron based alloy particles and further containing Co, Al and Nd obtained had an average axial diameter of 0.17 μm (from an electron micrograph (×30000)), an aspect ratio of 10.5, a BET specific surface area of 43.8 m²/g and a particle size distribution of 0.27. The X-ray crystallite size $D_{110}$ was 15.5 nm. The particles has a spindle shape and a narrow particle size distribution, and included Lew dendrites. In the particles, the Co content was 4.7 atm %, the Al content was 9.0 atm % and the Nd content was 3.0 atm %, respectively, based on the total Fe. As to the magnetic properties of the macnetic iron ba sed alloy particles, the coercive force Hc was 1680 Oe, the saturation magnetization σs was 144.9 emu/g, and the Squareness (Br/Bm) was 0.518. When a sheet was produced by using the obtained magnetic iron based alloy particles, the coercive force Hc was 1610 Oe, the Squareness (Br/Bm) was 0.855, and the S.F.D. was 0.450.

Examples 17 to 23, Comparazive Examples 9 to 13
<Production of Spindle-shaped Goethite Particles>

Spindle-shaped goethite particles were produced in the same way as in Example 14 except for varying the conditions for producing spindle-shaped goethite seed particles as shown in Table 6 and the conditions for growing the goethite as shown in Table 8. Various prhoerties of the goethite seed particles discharged are shown in Table 7, and various propaertes of the spindle-shaped goethite particles produced are shown in Table 9.

Examples 24 to 30, Comparative Examples 14 to 18
<Production of Spindle-shaped Hematite Particles>

Spindle shaped hematite particles were produced in the same way as in Example 15 except for varying the kind of spindle-shaped goethite particles as the precursor, the kind and amount of coating material used as the anti-sintering agent, the dehydration temperature and the heating temperature thereafter. The main producing conditions and various properties of the spindle-shaped hematite particles obtained are shown in Table 10.

The relationship between the content x (atm %) of a rare earth element based on the total Fe and the ratio $D_{104}/D_{110}$ of the X-ray crystallite size in the spindle-shaped hematite particles obtained in Examples 15, and 24 to 30 and Comparative Examples 14 to 18 is shown in FIG. 11. The plotted symbol "o" indicates Example and "Δ" Comparative Example. The straight line A shows that $D_{104}/D_{110}=0.500-0.03 \times x$ in the case where $0.5 \leq x \leq 10$, and the straight line A' shows that $D_{104}/D_{110}=0.20$ in the case where $10 \leq x \leq 15$. The straight line B shows that $D_{104}/D_{110}=0.665 -0.03 \times x$ in the case where $0.5 \leq x \leq 10$, and the straight line B' shows that $D_{104}/D_{110}=0.365$ in the case where $10 \leq x \leq 15$.

The ratio $D_{104}/D_{110}$ of the X-ray crystallite size of the spindle-shaped hematite particles of the present invention is in the range of 0.20 to 0.65, preferably in the range enclosed by the straight lines A, A', x=15, B', B and x=0.

Examples 31 to 37, Comparative Examples 19 to 23
<Production of Magnetic Iron Based Alloy Particles>

Magnetic iron base d alloy particles were produced in the said way as in Example 16 except for varying the kind of particles as precursor particles and the temperature for the heat streatment for reduction. The conditions for reduction and various properties of the magnetic iron based alloy particles obtained are shown in Table 11.

Example 38
<Production of Spindle-shaped Goethite Particles>

A mixed solution was prepared in a reaction vessel into which $N_2$ gas was introduced so as to form a non-oxidizing atmosphere, by adding 32.0 liters of 0.374-N aqueous NaOH solution (the ratio of NaOH Is 33.3 mol % based on the mixed alkali) to 3.7 liters of 6.5-N aqueous $Na_2CO_3$ solution. 13.3 liters of aqueous ferrous sulfate solution containing 1.5 mol/liter of $F^{2+}$ (the aqueous alakali solution corresponds to 1.5 equivalents based on the ferrous sulfate) was then added to the mixed solution and the temperature of the obtained suspension was raised to 47° C. and maintained the same temperature for 120 minutes. Thereafter, 311 g of cobalt sulfate (5.5 atm % (calculated as Co) based on the total Fe in the process of producing seed particles and 3.67 atm % (calculated as Co) based on the total Fe in the process of producing seed particles and the process of the growth reaction) which was dissolved in 1 liter of purified water was added to the suspension, and the suspension was stirred and mixed. After aging the suspension by maintaining it at pH 9.5 in the non-oxidizing atmosophere for 180 minutes, air was introduced into the suspension for 6.0 hours at a rate of 70 liters per minute at 47° C., thereby producing spindle-shaped goethite seed particles.

A part of the slurry containing the spindle-shaped goethite seed particles for measurement was discharged. The spindle-shaped goethite seed particles obtained through filtration, washing with purified water and drying at a temperature of 120° C. had an average axial diameter of 0.30 $\mu$m (from an electron micrograph (×30000)), an aspect ratio of 13.3, and a BET specific surface area of 80.2 $m^2$/g. No dendrites were included in the particles and the particle size distribut on was narrow. After the spindle-shaped goethite seed particles of the slurry was separated out by the solid-liquid separation, the Co content in the solution was analyzed, As a result, no Co ion was detected in the filtrate. Further, the spindle-shaped goethite seed particles contained 5.5 atm % (equivalent to 3.7 atm % (calculated as Co) based on the total Fe in the goethite particles after the growth reaction) of Co calculated as Co based on the total Fe in the seed particles. That is, 100% of the Co ions added were adsorbed.

A mixed solution was prepared in the reaction vessel into which $N_2$ gas was introduced so as to form a non-oxidizing atmosphere, by adding 2.0 liters of 3.0-N aqueous NaOH solution (NAOH is equivalent to 33.3 mol % based on the mixed alkali) to 1.85 liters of 6.5-N aqueous $Na_2CO_3$ Solution The mixed solution and 6.66 liters of aqueous ferrous sulfate solution containing 1.5 mol/liter of $Fe^{2+}0$ (the aqueous alkali solution corresponds to 1.5 atm % equivalents based on the ferrous sulfate) were added to the suspension containing the spindle-shaped goethite seed particles and 225 ml (equivalent to 1.5 (calculated as Nd) based on the total Fe in the goethite particles) of aqueous neodymium nitrate solution of 2.0 mol/liter, and the temperature of the resultant suspension was raised to 47° C. and maintained at the same temperature for 20 minutes. At a pH of 9.5 (the difference in the pH between the process of producing the goethite seed particles and this process is 0), 403 g (equivalent to 5.0 atm % (calculated as Al) based on the total Fe) of sodium aluminate ($Al_2O_3$ content was 19 wt %) was added to the resultant suspension. The suspension was stirred, mixed and aged. Thereafter, air was introduced into the suspension For 2.0 hours at a rate of 150 liters per minute at 50° C., thereby growing the goethite.

After the completion of the growth reaction, the particles were filtered out, washing with purified water, drying at a temperature of 120° C. and crushed by a roller.

The spindle-shaped goethite particles obtained had an average axial diameter of 0.31 $\mu$m (from an electron micrograph (×30000)), an aspect ratio of 13.6, a BET specific surface area of 102.0 $m^2$/g and a particle size distribution of 0.22. No dendrites were included in the particles and the particle size distribution was narrow. The goethite particles contained 3.6 atm % of Co (calculated as Co) based on the total Fe and 6.0 atm % of Al (calculated as Al) based on the total Fe.

Example 39
<Production of Spindle-shaped Hematite Particles>

The cake containing 2500 g (25.1 mol calculated as Fe) of the spindle-shaped goethite particles obtained in Example 38 was suspended in 40 liters of water. The pH of the suspension was 7.9. After the suspension was stirred for 10 minutes, 313 ml (equivalent to 2.5 atm % (calculated as Nd) based on the total Fe in the goethite particles) of aqueous neodymium nitrate solution of 2 mol/liter was further added to the suspension and the suspension was stirred for 10 minutes.

The pH of the suspension was adjusted to 95 by adding an aqueous sodium hydrate, and purified water was added until the total amount of the suspension was 50 liter. After the suspension was stirred for 10 minutes, it was filtered by a filter press. The obtained material was washing with purified water, passed through a granulation sieve of 4-mm meshes, and drying at a temperature of 120° C. to obtain goethite particles coated with an Al compound and a Nd compound. In the goethite particles, the Co content was 3.6 atm %, the Al content was 5.1 atm % and the Nd content was 2.5 atm %, respectively, based on the total Fe. 400 g of the spindle-shaped goethite particles coated with the Al compound and Nd compound obtained was heated to 780° C. in the air, and spindle-shaped hematite particles coated with the Al compound and the Al compound and Nd compound were obtained.

The spindle-shaped hematite particles obtained had an average axial diameter of 0.28 $\mu$m (from an electron micrograph (×30000)), an aspect ratio of 12.8, a BET specific surface area of 36.1 $m^2$/g and a particle size distribution of 0.24. The X-ray crystallite size $D_{104}$ was 14.5 nm, $D_{110}$ was 26.8 nm, and the ratio $D_{104}/D_{110}$ was 0.54.

In the hematite particles, the Co content was 3.6 atm %, the Al content was 5.1 atm % and the Nd content was 2.5 atm %, respectively, based on the total Fe.

Example 40
<Production of Magnetic Iron Based Alloy Particles>

100 g of the spindle-shaped hematite particles coated with the Al compound and the Nd compound obtained in Example 39 were charged into a fixed-bed reactor of 72 mm in inner diameter, and $H_2$ gas Was introduced into the reactor at a rate of 35 liters per minute so that the hematite particles were reduced at 500° C.

First, only nitrogen gas was introduced into the reactor so as to prevent the rapid oxidation of the magnetic iron based alloy particles containing Co, Al and Nd obtained by the reduction. Thereafter a mixed gas of nitrogen gas and a small amount of air was introduced with the ratio of air gradually increased with time so as to form a stable oxide layer on the surfaces.

The magnetic iron based alloy particles containing Co, Al and Nd obtained had an average axial diameter of 0.18 μm (from an electron micrograph (×30000)), an aspect ratio of 10.8, a BET specific surface area of 40.2 m$^2$/g and a particle size distribution of 0.26. the X-ray crystallite size $D_{110}$ was 16.0 nm. The particles has a spindle shape and a narrow particle size distribution, and included no dendrites. In the particles, the Co content was 3.7 atm %, the Al content was 5.0 atm % and the Nd content was 2.5 atm %, respectively, based on the total Fe. As to the magnetic properties of the magnetic iron based alloy particles, the coercive force Hc was 1710 Oe, the saturation magnetization σs was 154.3 emu/g, and the Squareness (Er/Bm) was 0.504. When a sheet was produced by using the obtained magnetic iron based alloy particles, the coercive force Hc was 1640 Oe, the squareness (Br/Bm) was 0.860, and the S.F.D. was 0.446.

Examples 41 to 46
<Production of Spindle-shaped Goethite Particles>

Spindle-shaped goethite particles were produced in the same way as in Example 38 except for varying the conditions for producing spindle-shaped goethite seed particles as shown in Table 12 and the conditions for growing the goethite as shown in Table 14. various properties of the goethite seed particles discharged are shown in Table 13, and various properties of the spindleshaped goethite particles produced are shown in Table 156

Examples 47 to 52
<Production of Spindle-shaped Hematite Particles>

Spindle shaped hematite particles were produced in the same way as in Example 39 except for varying the kind of spindle-shaped goethite particles as the precursor, the kind and amount of coating material used as the anti-sintering agent, the dehydration temperature and the heating temperature thereafter. The main producing conditions and various properties of the spindle-shaped hematite particles obtain ed are shown in Table 16.

Examples 53 to 58
<Production of Magnetic Iron Based Alloy Particles>

Magnetic iron based alloy particles were produced in the same way as in Example 40 except for varying the kind of particles as precursor particles and the temperature for the heat treatment for reduction. The conditions for reduction and various properties of the magnetic iron based alloy particles obtained are shown Table 17.

TABLE 1

Production of spindle-shaped goethite seed particles
Mixed aqueous alkali solution

| | Aqueous alkali carbonate solution | | | Aqueous alkali hydroxide solution | | | Alkali ratio NaOH/ |
|---|---|---|---|---|---|---|---|
| | Kind | Concentration (mol/l) | Amount used (1) | Kind | Concentration (mol/l) | Amount used (1) | total alkali (mol %) |
| Ex. 4 | Na$_2$CO$_3$ | 6.5 | 3.7 | NaOH | 0.374 | 32 | 33.3 |
| Ex. 5 | Na$_2$CO$_3$ | 6.5 | 3.7 | NaOH | 0.374 | 32 | 33.3 |
| Ex. 6 | Na$_2$CO$_3$ | 6.5 | 3.7 | NaOH | 0.374 | 32 | 33.3 |
| Ex. 7 | Na$_2$CO$_3$ | 7.35 | 3.7 | NaOH | 0.3 | 32 | 25.9 |
| Ex. 8 | Na$_2$CO$_3$ | 6.5 | 3.7 | NaOH | 0.374 | 32 | 33.3 |
| Comp. Ex. 1 | Na$_2$CO$_3$ | 6.5 | 3.7 | NaOH | 0.374 | 32 | 33.3 |
| Comp. Ex. 2 | Na$_2$CO$_3$ | 6.5 | 3.7 | NaOH | 0.374 | 32 | 33.3 |
| Comp. Ex. 3 | Na$_2$CO$_3$ | 6.5 | 3.7 | NaOH | 0.374 | 32 | 33.3 |
| Comp. Ex. 4 | Na$_2$CO$_3$ | 6.5 | 3.7 | NaOH | 0.374 | 32 | 33.3 |

Production of spindle-shaped goethite particies

| | Aqueous ferrous salt solution | | | Equivalent ratio (total alkali/Fe$^{+2}$) | Aging | | |
|---|---|---|---|---|---|---|---|
| | Kind | Concentration (mol/l) | Amount used (1) | | Atmosphere | Temperature (° C.) | Time (hr) |
| Ex. 4 | FeSO$_4$ | 1.5 | 13.3 | 1.5 | N$_2$ | 47 | 5 |
| Ex. 5 | FeSO$_4$ | 1.5 | 13.3 | 1.5 | N$_2$ | 47 | 5 |
| Ex. 6 | FeSO$_4$ | 1.5 | 13.3 | 1.5 | N$_2$ | 47 | 5 |
| Ex. 7 | FeSO$_4$ | 1.5 | 13.3 | 1.6 | N$_2$ | 47 | 5 |
| Ex. 8 | FeSO$_4$ | 1.5 | 13.3 | 1.5 | N$_2$ | 47 | 5 |
| Comp. Ex. 1 | FeSO$_4$ | 1.5 | 13.3 | 1.5 | N$_2$ | 47 | 5 |
| Comp. Ex. 2 | FeSO$_4$ | 1.5 | 13.3 | 1.5 | N$_2$ | 47 | 5 |
| Comp. Ex. 3 | FeSO$_4$ | 1.5 | 13.3 | 1.5 | N$_2$ | 47 | 5 |
| Comp. Ex. 4 | FeSO$_4$ | 1.5 | 13.3 | 1.5 | N$_2$ | 47 | 5 |

TABLE 1-continued

Production of spindle-shaped goethite seed particles

| | Cobalt compound | | Adding time after the beginning of aging (min) | Temperature (° C.) | pH | Rate of aeration (l/min) |
|---|---|---|---|---|---|---|
| | Kind | Amount added (Co/total Fe in seed crystal reaction) (atom %) | | | | |
| Ex. 4 | CoSO$_4$ | 9 | 90 | 47 | 9.5 | 150 |
| Ex. 5 | CoSO$_4$ | 9 | 110 | 47 | 9.5 | 150 |
| Ex. 6 | CoSO$_4$ | 6 | 90 | 47 | 9.4 | 150 |
| Ex. 7 | CoSO$_4$ | 13 | 110 | 47 | 9.4 | 50 |
| Ex. 8 | CoSO$_4$ | 12 | 110 | 47 | 9.4 | 100 |
| Comp. Ex. 1 | — | — | — | 47 | 9.5 | 150 |
| Comp. Ex. 2 | CoSO$_4$ | 9 | 90 | 47 | 9.5 | 150 |
| Comp. Ex. 3 | CoSO$_4$ | 9 | 90 | 47 | 9.5 | 150 |
| Comp. Ex. 4 | CoSO$_4$ | 9 | 90 | 47 | 9.5 | 150 |

TABLE 2

Growth reaction of spindle-shaped goethite seed particles
Mixed aqueous alkali solution

| | Aqueous alkali carbonate solution | | | Aqueous alkali hydroxide solution | | | Alkali ratio NaOH/ total alkali (mol %) |
|---|---|---|---|---|---|---|---|
| | Kind | Concentration (mol/l) | Amount used (l) | Kind | Concentration (mol/l) | Amount used (l) | |
| Ex. 4 | Na$_2$CO$_3$ | 6.5 | 1.23 | NaOH | 3.0 | 2.0 | 33.3 |
| Ex. 5 | Na$_2$CO$_3$ | 6.5 | 3.7 | NaOH | 3.0 | 4.0 | 33.3 |
| Ex. 6 | Na$_2$CO$_3$ | 6.5 | 1.23 | NaOH | 3.0 | 2.0 | 33.3 |
| Ex. 7 | Na$_2$CO$_3$ | 6.5 | 2.1 | NaOH | 3.0 | 1.5 | 25.9 |
| Ex. 8 | Na$_2$CO$_3$ | 6.5 | 1.23 | NaOH | 3.0 | 2.0 | 33.3 |
| Comp. Ex. 1 | Na$_2$CO$_3$ | 6.5 | 1.23 | NaOH | 3.0 | 2.0 | 33.3 |
| Comp. Ex. 2 | — | — | — | — | — | — | — |
| Comp. Ex. 3 | — | — | — | — | — | — | — |
| Comp. Ex. 4 | — | — | — | — | — | — | — |

Growth reaction of spindle-shaped goethite seed particles

| | Aqueous ferrous salt solution | | | Equivalent ratio (total alkali/ Fe$^{+2}$) | Aluminum compound | |
|---|---|---|---|---|---|---|
| | Kind | Concentration (mol/l) | Amount used (l) | Total Fe ratio (mol %) | | Kind | Mount added Al/Fe (atom %) |
| Ex. 4 | FeSO$_4$ | 1.5 | 6.7 | 33.3 | 1.5 | Sodium aluminate | 5.0 |
| Ex. 5 | FeSO$_4$ | 1.5 | 13.3 | 50 | 1.5 | Sodium aluminate | 5.0 |
| Ex. 6 | FeSO$_4$ | 1.5 | 6.7 | 33.3 | 1.5 | Aluminum sulfate | 3.0 |
| Ex. 7 | FeSO$_4$ | 1.5 | 6.7 | 33.3 | 1.6 | Aluminum sulfate | 5.0 |
| Ex. 8 | FeSO$_4$ | 1.5 | 6.7 | 33.3 | 1.5 | Sodium aluminate | 5.0 |
| Comp. Ex. 1 | FeSO$_4$ | 1.5 | 6.7 | 33.3 | 1.5 | Sodium aluminate | 5.0 |
| Comp. Ex. 2 | — | — | — | — | — | — | — |
| Comp. | — | — | — | — | — | Sodium | 5.0 |

TABLE 2-continued

| | \*) Adding timing | Presence or absence of Co ion at addition | Temperature (° C.) | pH | Rate of aeration (l/min) |
|---|---|---|---|---|---|
| Ex. 3 | | | | | aluminate |
| Comp. Ex. 4 | — | — | — | — | Sodium aluminate 5.0 |

Growth reaction of spindle-shaped goethite seed particles

Aluminum compound

| | Adding timing \*) | Presence or absence of Co ion at addition | Temperature (° C.) | pH | Rate of aeration (l/min) |
|---|---|---|---|---|---|
| Ex. 4 | A | Absence | 47 | 9.6 | 150 |
| Ex. 5 | A | Absence | 47 | 9.6 | 150 |
| Ex. 6 | B | Absence | 47 | 9.5 | 150 |
| Ex. 7 | A | Absence | 47 | 9.6 | 150 |
| Ex. 8 | B | Absence | 47 | 9.5 | 150 |
| Comp. Ex. 1 | A | Absence | 47 | 9.6 | 150 |
| Comp. Ex. 2 | — | — | — | — | — |
| Comp. Ex. 3 | C | Presence | — | — | — |
| Comp. Ex. 4 | D | Presence | — | — | — |

\*) Timing of the addition of aluminum compound and compound of rare earth element.
A: Adding to aqueous suspension after the production of goethite seed particles
B: Adding to mixed alkali solution in the growing reaction
C: Adding to aqueous ferrous salt solution in the seed crystal particles
D: Adding to reaction the production of goethite seed particles (Degree of oxidization: 40%)

TABLE 3

Properties of goethite seed particles

| | Kind | Shape | Average major axis diameter ($\mu$m) | Aspect ratio | BET specific surface area (m$^2$/g) | Co content (Co/Fe) (atom %) | Al content (Al/Fe) (atom %) |
|---|---|---|---|---|---|---|---|
| Ex.4 | Goethite particle | Spindle | 0.25 | 12.5 | 81 | 9.1 | — |
| Ex.5 | Goethite particle | Spindle | 0.23 | 13.0 | 83 | 9.0 | — |
| Ex.6 | Goethite particle | Spindle | 0.24 | 12.8 | 78 | 5.9 | — |
| Ex.7 | Goethite particle | Spindle | 0.20 | 12.0 | 98 | 13.0 | — |
| Ex.8 | Goethite particle | Spindle | 0.15 | 11.5 | 102 | 12.1 | — |
| Comp. Ex. 1 | Goethite particle | Spindle | 0.60 | 9.7 | 57 | — | — |
| Comp. Ex. 2 | — | — | — | — | — | — | — |
| Comp. Ex. 3 | — | — | — | — | — | — | — |
| Comp. Ex. 4 | — | — | — | — | — | — | — |

Properties of goethite particles

| | Kind | Shape | Average major axis diameter ($\mu$m) | Aspect ratio | BET specific surface area (m$^2$/g) | Co content (Co/Fe) (atm %) | Al content (Al/Fe) (atm %) | Particle size distribution |
|---|---|---|---|---|---|---|---|---|
| Ex. 4 | Goethite particle | Spindle | 0.26 | 13.5 | 110 | 6.1 | 5.0 | 0.19 |
| Ex. 5 | Goethite particle | Spindle | 0.27 | 13.8 | 106 | 4.6 | 5.0 | 0.20 |
| Ex. 6 | Goethite particle | Spindle | 0.26 | 13.4 | 105 | 3.9 | 3.1 | 0.20 |

TABLE 3-continued

| | | | | | | | | |
|---|---|---|---|---|---|---|---|---|
| Ex. 7 | Goethite particle | Spindle | 0.23 | 13.0 | 110 | 8.9 | 4.9 | 0.21 |
| Ex. 8 | Goethite particle | Spindle | 0.16 | 13.0 | 119 | 8.0 | 5.0 | 0.18 |
| Comp. Ex. 1 | Goethite particle | Spindle | 0.66 | 10 | 58 | — | 5.0 | — |
| Comp. Ex. 2 | Goethite particle | Spindle | 0.20 | 8.5 | 89 | 8.9 | — | — |
| Comp. Ex. 3 | Goethite particle | Spindle | 0.17 | 6.9 | 113 | 9.0 | 4.9 | — |
| Comp. Ex. 4 | Goethite particle | Spindle | 0.19 | 9.8 | 123 | 9.1 | 5.0 | — |

TABLE 4

Production of magnetic iron based alley particles
Anti-sintering agent

| | Aluminum compound | | Neodymium compound | | Boron compound | |
|---|---|---|---|---|---|---|
| | Kind | Amount added Al/Fe (atm %) | Kind | Amount added Nd/Fe (atm %) | Kind | Amount added B/Fe (atm %) |
| Ex. 9 | Aluminum nitrate | 4.0 | Neodymium nitrate | 2.5 | — | — |
| Ex. 10 | Aluminum nitrate | 4.0 | — | — | Boric acid | 10.0 |
| Ex. 11 | Alminum nitrate | 5.0 | Neodymium nitrate | 2.2 | — | — |
| Ex. 12 | Alminum nitrate | 4.0 | Neodymium nitrate | 2.5 | — | — |
| Ex. 13 | Alminum nitrate | 4.0 | Neodymium nitrate | 2.5 | — | — |
| Comp. Ex. 5 | Alminum nitrate | 4.0 | Neodymium nitrate | 2.5 | — | — |
| Comp. Ex. 6 | Alminum nitrate | 9.0 | Neodymium nitrate | 2.5 | — | — |
| Comp. Ex. 7 | Alminum nitrate | 4.0 | Neodymium nitrate | 2.5 | — | — |
| Comp. Ex. 8 | Alminum nitrate | 4.0 | Neodymium nitrate | 2.5 | — | — |

TABLE 4-continued

Production of magnetic iron based alley particles

| | Heat treatment | | Reduction treatment | |
|---|---|---|---|---|
| | | | | Hydrogen |
| | Temperature (° C.) | Atmosphere | Temperature (° C.) | flow rate (l/min) |
| Ex. 9 | 750 | Air | 500 | 35 |
| Ex. 10 | 400 | Air | 400 | 35 |
| Ex. 11 | 750 | Air | 500 | 35 |
| Ex. 12 | 750 | Air | 580 | 35 |
| Ex. 13 | 750 | Air | 510 | 35 |
| Comp. Ex. 5 | 750 | Air | 500 | 35 |
| Comp. Ex. 6 | 750 | Air | 500 | 35 |
| Comp. Ex. 7 | 750 | Air | 500 | 35 |
| Comp. Ex. 8 | 750 | Air | 500 | 35 |

TABLE 5

Properties of magnetic iron based alley particles

| | Average major axis diameter (μm) | Aspect ratio | BET specific surface area (m²/g) | X-ray crystalline diameter $D_{110}$ (nm) | Particle size distribution |
|---|---|---|---|---|---|
| Ex. 9 | 0.16 | 10 | 49.2 | 16.0 | 0.27 |
| Ex. 10 | 0.16 | 10.5 | 48.5 | 15.8 | 0.28 |
| Ex. 11 | 0.16 | 10 | 50.1 | 16.2 | 0.27 |
| Ex. 12 | 0.14 | 9.5 | 51.2 | 15.5 | 0.28 |
| Ex. 13 | 0.10 | 9.5 | 54.2 | 14.4 | 0.26 |
| Comp. Ex. 5 | 0.34 | 5.5 | 30.1 | 23.0 | — |
| Comp. Ex. 6 | 0.13 | 8.0 | 51.3 | 15.1 | — |
| Comp. Ex. 7 | 0.11 | 6.5 | 50.4 | 14.8 | — |
| Comp. Ex. 8 | 0.12 | 8.5 | 50.4 | 15.0 | — |

TABLE 5-continued

| | Properties of magnetic iron based alley particles | | | | | |
|---|---|---|---|---|---|---|
| | Co content Co/Fe (atom %) | Al content Al/Fe (atom %) | Nd content Nd/Fe (atom %) | B content B/Fe (atom %) | Coercive force (Oe) | Saturation manetization (emu/g) |
| Ex. 9 | 6.0 | 9.0 | 2.4 | — | 1720 | 150.4 |
| Ex. 10 | 4.5 | 8.9 | — | 9.8 | 1810 | 145.7 |
| Ex. 11 | 3.9 | 8.0 | 2.2 | — | 1670 | 142.0 |
| Ex. 12 | 8.6 | 9.0 | 2.5 | — | 1830 | 150.2 |
| Ex. 13 | 8.0 | 8.9 | 2.4 | — | 1976 | 152.5 |
| Comp. Ex 5 | — | 9.0 | 2.5 | — | 1210 | 171.3 |
| Comp. Ex. 6 | 9.0 | 9.0 | 2.5 | — | 1410 | 134.5 |
| Comp. Ex. 7 | 9.0 | 9.0 | 2.4 | — | 1430 | 151.4 |
| Comp. Ex. 8 | 9.0 | 8.9 | 2.5 | — | 1760 | 150.3 |

| | Properties of magnetic iron based alley particles Squareness $\sigma r/\sigma s$ | Sheet properties | | |
|---|---|---|---|---|
| | | Coercive force (Oe) | Squareness Br/Bm | SFD |
| Ex. 9 | 0.509 | 1700 | 0.861 | 0.441 |
| Ex. 10 | 0.510 | 1840 | 0.855 | 0.450 |
| Ex. 11 | 0.510 | 1665 | 0.850 | 0.450 |
| Ex. 12 | 0.515 | 1800 | 0.870 | 0.430 |
| Ex. 13 | 0.523 | 1950 | 0.872 | 0.421 |
| Comp. Ex. 5 | 0.397 | 1250 | 0.731 | 0.705 |
| Comp. Ex. 6 | 0.441 | 1420 | 0.763 | 0.531 |
| Comp. Ex. 7 | 0.450 | 1430 | 0.775 | 0.522 |
| Comp. Ex. 8 | 0.501 | 1730 | 0.835 | 0.501 |

TABLE 6

| | Production of spindle-shaped goethite seed particles Mixed aqueous alkali solution | | | | | | |
|---|---|---|---|---|---|---|---|
| | Aqueous alkali carbonate solution | | | Aqueous alkali hydroxide solution | | | Alkali ratio NaOH/ total alkali (mol %) |
| | Kind | Concentration (mol/l) | Amount used (l) | Kind | Concentration (mol/l) | Amount used (l) | |
| Ex. 17 | $Na_2CO_3$ | 6.5 | 3.7 | NaOH | 0.374 | 32 | 33.3 |
| Ex. 18 | $Na_2CO_3$ | 6.5 | 3.7 | NaOH | 0.374 | 32 | 33.3 |
| Ex. 19 | $Na_2CO_3$ | 6.5 | 3.7 | NaOH | 0.374 | 32 | 33.3 |
| Ex. 20 | $Na_2CO_3$ | 6.5 | 3.7 | NaOH | 0.374 | 32 | 33.3 |
| Ex. 21 | $Na_2CO_3$ | 6.5 | 3.7 | NaOH | 0.5 | 32 | 40.0 |
| Ex. 22 | $Na_2CO_3$ | 6.5 | 3.7 | NaOH | 0.5 | 32 | 40.0 |
| Ex. 23 | $Na_2CO_3$ | 6.5 | 3.7 | NaOH | 0.374 | 32 | 33.3 |
| Comp. Ex. 9 | $Na_2CO_3$ | 6.5 | 3.7 | NaOH | 0.374 | 32 | 33.3 |
| Comp. Ex. 10 | $Na_2CO_3$ | 6.5 | 3.7 | NaOH | 0.374 | 32 | 33.3 |
| Comp. Ex. 11 | $Na_2CO_3$ | 6.5 | 3.7 | NaOH | 0.374 | 32 | 33.3 |
| Comp. Ex. 12 | $Na_2CO_3$ | 6.5 | 3.7 | NaOH | 0.5 | 32 | 40.0 |
| Comp. Ex. 13 | $Na_2CO_3$ | 6.5 | 3.7 | NaOH | 0.5 | 32 | 40.0 |

TABLE 6-continued

| | Production of spindle-shaped goethite seed particles | | | | | |
|---|---|---|---|---|---|---|
| | Aqueous ferrous salt solution | | Equivalent ratio (total alkali/Fe$^{+2}$) (1) | Aging | | |
| | Kind | Concentration (mol/l) | Amount used | | Atmosphere | Temperature (°C.) | Time (hr) |
| Ex. 17 | FeSO$_4$ | 1.5 | 13.3 | 1.5 | N$_2$ | 47 | 5 |
| Ex. 18 | FeSO$_4$ | 1.5 | 13.3 | 1.5 | N$_2$ | 47 | 5 |
| Ex. 19 | FeSO$_4$ | 1.5 | 13.3 | 1.5 | N$_2$ | 47 | 5 |
| Ex. 20 | FeSO$_4$ | 1.5 | 13.3 | 1.5 | N$_2$ | 47 | 5 |
| Ex. 21 | FeSO$_4$ | 1.5 | 13.3 | 1.6 | N$_2$ | 47 | 5 |
| Ex. 22 | FeSO$_4$ | 1.5 | 13.3 | 1.6 | N$_2$ | 47 | 5 |
| Ex. 23 | FeSO$_4$ | 1.5 | 13.3 | 1.5 | N$_2$ | 47 | 5 |
| Comp. Ex. 9 | FeSO$_4$ | 1.5 | 13.3 | 1.5 | N$_2$ | 47 | 5 |
| Comp. Ex. 10 | FeSO$_4$ | 1.5 | 13.3 | 1.5 | N$_2$ | 47 | 5 |
| Comp. Ex. 11 | FeSO$_4$ | 1.5 | 13.3 | 1.5 | N$_2$ | 47 | 5 |
| Comp. Ex. 12 | FeSO$_4$ | 1.5 | 13.3 | 1.6 | N$_2$ | 47 | 5 |
| Comp. Ex. 13 | FeSO$_4$ | 1.5 | 13.3 | 1.6 | N$_2$ | 47 | 5 |

| | Production of spindle-shaped goethite seed particles | | | | |
|---|---|---|---|---|---|
| | Cobalt compound | | | | |
| | Kind | Amount added (Co/Fe in seed crystal reaction) (atom %) | Adding time after the beginning of aging (min) | Temperature (°C.) | pH | Rate of aeration (l/min) |
| Ex. 17 | CoSO$_4$ | 6 | 110 | 47 | 9.5 | 70 |
| EX. 18 | CoSO$_4$ | 6 | 110 | 47 | 9.5 | 70 |
| Ex. 19 | CoSO$_4$ | 9 | 180 | 47 | 9.4 | 70 |
| Ex. 20 | CoSO$_4$ | 9 | 180 | 47 | 9.4 | 70 |
| Ex. 21 | CoSO$_4$ | 15 | 210 | 47 | 9.4 | 50 |
| Ex. 22 | CoSO$_4$ | 15 | 210 | 47 | 9.4 | 50 |
| Ex. 23 | CoSO$_4$ | 9 | 180 | 47 | 9.4 | 70 |
| Comp. Ex. 9 | CoSO$_4$ | 6 | 110 | 47 | 9.5 | 70 |
| Comp. Ex. 10 | CoSO$_4$ | 6 | 110 | 47 | 9.5 | 70 |
| Comp. Ex. 11 | CoSO$_4$ | 9 | 180 | 47 | 9.5 | 70 |
| Comp. Ex. 12 | CoSO$_4$ | 15 | 210 | 47 | 9.4 | 50 |
| Comp. Ex. 13 | CoSO$_4$ | 15 | 210 | 47 | 9.4 | 50 |

TABLE 7

| | Properties of goethite seed particles | | | | | |
|---|---|---|---|---|---|---|
| | Kind | Shape | Average major axis diameter (μm) | Aspect ratio | BET specific surface area (m$^2$/g) | Co content (Co/total Fe in seed particle) (atom %) |
| Ex. 17 | Goethite particle | Spindle | 0.32 | 13.5 | 75 | 6.0 |
| Ex. 18 | Goethite particle | Spindle | 0.32 | 13.5 | 75 | 6.0 |
| Ex. 19 | Goethite particle | Spindle | 0.20 | 12.8 | 100 | 8.9 |
| Ex. 20 | Goethite particle | Spindle | 0.20 | 12.8 | 100 | 8.9 |
| Ex. 21 | Goethite particle | Spindle | 0.15 | 12.0 | 146 | 14.8 |
| Ex. 22 | Goethite particle | Spindle | 0.15 | 12.0 | 146 | 14.8 |
| Ex. 23 | Goethite particle | Spindle | 0.20 | 12.8 | 100 | 8.9 |
| Comp. Ex. 9 | Goethite particle | Spindle | 0.32 | 13.5 | 75 | 6.0 |

TABLE 7-continued

| | | Properties of goethite seed particles | | | | |
|---|---|---|---|---|---|---|
| | Kind | Shape | Average major axis diameter (μm) | Aspect ratio | BET specific surface area (m²/g) | Co content (Co/total Fe in seed particle) (atom %) |
| Comp. Ex. 10 | Goethite particle | Spindle | 0.32 | 13.5 | 75 | 6.0 |
| Comp. Ex. 11 | Goethite particle | Spindle | 0.20 | 12.8 | 100 | 8.9 |
| Comp. Ex. 12 | Goethite particle | Spindle | 0.15 | 12.0 | 146 | 14.8 |
| Comp. Ex. 13 | Goethite particle | Spindle | 0.15 | 12.0 | 146 | 14.8 |

TABLE 8

| | Growth reaction of spindle-shaped goethite seed particles Mixed aqueous alkali solution | | | | | |
|---|---|---|---|---|---|---|
| | Aqueous alkali carbonate solution | | Aqueous alkali hydroxide solution | | | Alkali ratio NaOH/ total alkali (mol %) |
| | Kind | Concentration (mol/l) | Amount used (1) | Kind | Concentration (mol/l) | Amount used (1) |
| Ex. 17 | $Na_2CO_3$ | 6.5 | 1.85 | NaOH | 3.0 | 2.0 | 33.3 |
| Ex. 18 | $Na_2CO_3$ | 6.5 | 1.85 | NaOH | 3.0 | 2.0 | 33.3 |
| Ex. 19 | $Na_2CO_3$ | 6.5 | 3.7 | NaOH | 3.0 | 4.0 | 33.3 |
| Ex. 20 | $Na_2CO_3$ | 6.5 | 3.7 | NaOH | 3.0 | 4.0 | 33.3 |
| Ex. 21 | $Na_2CO_3$ | 6.5 | 2.1 | NaOH | 3.0 | 1.5 | 25.9 |
| Ex. 22 | $Na_2CO_3$ | 6.5 | 2.1 | NaOH | 3.0 | 1.5 | 25.9 |
| Ex. 23 | $Na_2CO_3$ | 6.5 | 3.7 | NaOH | 3.0 | 4.0 | 33.3 |
| Comp. Ex. 9 | $Na_2CO_3$ | 6.5 | 1.85 | NaOH | 3.0 | 2.0 | 33.3 |
| Comp. Ex. 10 | $Na_2CO_3$ | 6.5 | 1.85 | NaOH | 3.0 | 2.0 | 33.3 |
| Comp. Ex. 11 | $Na_2CO_3$ | 6.5 | 3.7 | NaOH | 3.0 | 4.0 | 33.3 |
| Comp. Ex. 12 | $Na_2CO_3$ | 6.5 | 2.1 | NaOH | 3.0 | 1.5 | 25.9 |
| Comp. Ex. 13 | $Na_2CO_3$ | 6.5 | 2.1 | NaOH | 3.0 | 1.5 | 25.9 |

| | Growth reaction of spindle-shaped goethite seed particles | | | | |
|---|---|---|---|---|---|
| | Aqueous ferrous salt solution | | | Equivalent ratio | |
| | Kind | Concentration (mol/l) | Amount used (1) | total Fe ratio (mol %) | (total alkali/ $Fe^{+2}$) | Alminum compound Kind |
| Ex. 17 | $FeSO_4$ | 1.5 | 6.66 | 33.3 | 1.5 | Sodium aluminate |
| Ex. 18 | $FeSO_4$ | 1.5 | 13.3 | 33.3 | 1.5 | Sodium aluminate |
| Ex. 19 | $FeSO_4$ | 1.5 | 13.3 | 50 | 1.5 | Alminum sulfate |
| Ex. 20 | $FeSO_4$ | 1.5 | 13.3 | 50 | 1.5 | Alminum sulfate |
| Ex. 21 | $FeSO_4$ | 1.5 | 6.66 | 33.3 | 1.6 | Sodium aluminate |
| Ex. 22 | $FeSO_4$ | 1.5 | 6.66 | 33.3 | 1.6 | Sodium aluminate |

TABLE 8-continued

| | | | | | | |
|---|---|---|---|---|---|---|
| Ex. 23 | FeSO₄ | 1.5 | 13.3 | 50 | 1.5 | Sodium aluminate |
| Comp. Ex. 9 | FeSO₄ | 1.5 | 6.66 | 33.3 | 1.5 | Sodium aluminate |
| Comp. Ex. 10 | FeSO₄ | 1.5 | 6.66 | 33.3 | 1.5 | Sodium aluminate |
| Comp. Ex. 11 | FeSO₄ | 1.5 | 13.3 | 50 | 1.5 | Alminum nitrate |
| Comp. Ex. 12 | FeSO₄ | 1.5 | 6.66 | 33.3 | 1.6 | Sodium aluminate |
| Comp. Ex. 13 | FeSO₄ | 1.5 | 6.66 | 33.3 | 1.6 | Sodium aluminate |

Growth reaction of spindle-shaped goethite seed particles

| | Aluminum compound | | Presence or absence of Co ion at addition | Temperature (° C.) | pH | Rate of aeration (l/min) |
|---|---|---|---|---|---|---|
| | Amount added Al/Fe (atom %) | Time of addition *) | | | | |
| Ex. 17 | 6.0 | A | Absence | 47 | 9.6 | 150 |
| Ex. 18 | 6.0 | A | Absence | 47 | 9.6 | 150 |
| Ex. 19 | 6.0 | A | Absence | 47 | 9.5 | 150 |
| Ex. 20 | 6.0 | A | Absence | 47 | 9.5 | 150 |
| Ex. 21 | 7.0 | B | Absence | 47 | 9.6 | 150 |
| Ex. 22 | 7.0 | B | Absence | 47 | 9.6 | 150 |
| Ex. 23 | 6.0 | B | Absence | 47 | 9.5 | 150 |
| Comp. Ex. 9 | 6.0 | A | Absence | 47 | 9.6 | 150 |
| Comp. Ex. 10 | 6.0 | A | Absence | 47 | 9.6 | 150 |
| Comp. Ex. 11 | 6.0 | A | Absence | 47 | 9.5 | 150 |
| Comp. Ex. 12 | 7.0 | B | Absence | 47 | 9.6 | 150 |
| Comp. Ex. 13 | 7.0 | B | Absence | 47 | 9.6 | 150 |

*) Timing of the addition of aluminum compound and compound of rare earth element.
A: Adding to aqueous suspension after the production of goethite seed particles
B: Adding to mixed alkali solution in the growing reaction

TABLE 9

Properties of goethite particles

| | Kind | Shape | Average major axis diameter (μm) | Aspect ratio | BET specific surface area (m²/g) | Co content (Co/total Fe in seed particle) (atm %) | Al content Al/total Fe) (atm %) | Particle size distribution |
|---|---|---|---|---|---|---|---|---|
| Ex. 17 | Goethite particle | Spindle | 0.33 | 14.0 | 90 | 3.9 | 6.0 | 0.23 |
| Ex. 18 | Goethite particle | Spindle | 0.33 | 14.0 | 90 | 3.9 | 6.0 | 0.23 |
| Ex. 19 | Goethite particle | Spindle | 0.22 | 13.2 | 118 | 6.0 | 5.9 | 0.20 |
| Ex. 20 | Goethite particle | Spindle | 0.22 | 13.2 | 118 | 6.0 | 5.9 | 0.20 |
| Ex. 21 | Goethite particle | Spindle | 0.16 | 13.0 | 160 | 9.9 | 7.0 | 0.18 |
| Ex. 22 | Goethite particle | Spindle | 0.16 | 13.0 | 160 | 9.9 | 7.0 | 0.18 |
| Ex. 23 | Goethite particle | Spindle | 0.22 | 13.2 | 118 | 6.0 | 5.9 | 0.20 |
| Comp. Ex. 9 | Goethite particle | Spindle | 0.33 | 14.0 | 90 | 3.9 | 6.0 | — |
| Comp. Ex. 10 | Goethite particle | Spindle | 0.33 | 14.0 | 90 | 3.9 | 6.0 | — |
| Comp. Ex. 11 | Goethite particle | Spindle | 0.22 | 13.2 | 118 | 6.0 | 5.9 | — |
| Comp. Ex. 12 | Goethite particle | Spindle | 0.16 | 13.0 | 160 | 9.9 | 7.0 | — |

TABLE 9-continued

| | | | Properties of goethite particles | | | | | |
|---|---|---|---|---|---|---|---|---|
| | Kind | Shape | Average major axis diameter (μm) | Aspect ratio | BET specific surface area (m²/g) | Co content (Co/total Fe in seed particle (atm %) | Al content Al/total Fe) (atm %) | Particle size distribution |
| Comp. Ex. 13 | Goethite particle | Spindle | 0.16 | 13.0 | 160 | 9.9 | 7.0 | — |

TABLE 10

Production of hematite particles

| | Anti-sintering agent | | | | Heat treatment | |
|---|---|---|---|---|---|---|
| | Rare earth compound (Ln) | | Other compound (Me) | | | |
| | Kind | Amount added Ln/Fe (atm %) | Kind | Amount added Me/Fe (atm %) | Temperature (° C.) | Atmosphere |
| Ex. 24 | Neodymium nitrate | Nd 1.5 | — | — | 790 | Air |
| Ex. 25 | Neodymium nitrate | Nd 1.5 | Alminum nitrate | Al 4.0 | 810 | Air |
| Ex. 26 | Neodymium nitrate | Nd 4.0 | Alminum nitrate | Al 2.0 | 740 | Air |
| Ex. 27 | Neodymium nitrate | Nd 2.0 | Alminum nitrate | Al 2.0 | 740 | Air |
| Ex. 28 | Neodymium nitrate | Nd 6.0 | — | — | 700 | Air |
| Ex. 29 | Neodymium nitrate | Nd 12.0 | — | — | 700 | Air |
| Ex. 30 | Yttrium nitrate | Y 4.0 | Alminum nitrate | Al 2.0 | 740 | Air |
| Comp. Ex. 14 | — | — | Alminum nitrate | Al 2.0 | 810 | Air |
| Comp. Ex. 15 | — | — | Alminum nitrate Boric acid | Al 4.0 B 5.7 | 810 | Air |
| Comp. Ex. 16 | Neodymium nitrate | Nd 2.0 | Alminum nitrate | Al 2.0 | 870 | Air |
| Comp. Ex. 17 | Neodymium nitrate | Nd 6.0 | — | — | 300 | Air |
| Comp. Ex. 18 | Neodymium nitrate | Nd 20.0 | — | — | 700 | Air |

| | Properties of hematite particles | | | | | |
|---|---|---|---|---|---|---|
| | Kind | Shape | Average major axis diameter (μm) | Aspect ratio | BET specific surface area (m²/g) | Co content (Co/total Fe) (atom %) |
| Ex. 24 | Hematite particles | Spindle | 0.30 | 13.0 | 36.2 | 4.0 |
| Ex. 25 | Hematite particles | Spindle | 0.30 | 13.0 | 40.2 | 3.9 |
| Ex. 26 | Hematite particles | Spindle | 0.20 | 12.1 | 58.2 | 6.1 |
| Ex. 27 | Hematite particles | Spindle | 0.20 | 12.0 | 54.9 | 5.9 |
| Ex. 28 | Hematite particles | Spindle | 0.15 | 11.7 | 51.1 | 10.0 |
| Ex. 29 | Hematite particles | Spindle | 0.15 | 11.8 | 67.2 | 10.0 |
| Ex. 30 | Hematite particles | Spindle | 0.20 | 12.0 | 61.5 | 6.0 |

TABLE 10-continued

| | | | | | | |
|---|---|---|---|---|---|---|
| Comp. Ex. 14 | Hematite particles | Spindle | 0.27 | 12.2 | 38.8 | 4.0 |
| Comp. Ex. 15 | Hematite particles | Spindle | 0.28 | 12.7 | 41.3 | 4.0 |
| Comp. Ex. 16 | Hematite particles | Spindle | 0.18 | 9.3 | 35.2 | 6.0 |
| Comp. Ex. 17 | Hematite particles | Spindle | 0.15 | 12.0 | 53.4 | 10.0 |
| Comp. Ex. 18 | Hematite particles | Spindle | 0.15 | 11.8 | 84.4 | 10.0 |

| | Properties of hematite particles | | | | |
|---|---|---|---|---|---|
| | Al content Al/total Fe (atom %) | Rare earth element content Ln/total Fe (atom %) | Other element content Me/total Fe (atom %) | X-ray crystalline diameter $D_{104}$, $D_{110}$ (nm) (nm) $D_{104}/D_{110}$ | Particle size distribution |
| Ex. 24 | 6.0 | Nd 1.5 | — | 15.1, 26.9 0.56 | 0.27 |
| Ex. 25 | 10.0 | Nd 1.5 | — | 14.4, 26.1 0.55 | 0.27 |
| Ex. 26 | 8.1 | Nd 4.0 | — | 10.0, 21.9 0.46 | 0.24 |
| Ex. 27 | 8.0 | Nd 2.0 | — | 11.5, 22.0 0.52 | 0.24 |
| Ex. 28 | 7.0 | Nd 6.0 | — | 9.2, 21.9 0.42 | 0.22 |
| Ex. 29 | 7.0 | Nd 11.9 | — | 5.0, 21.7 0.23 | 0.22 |
| Ex. 30 | 8.0 | Y 4.0 | — | 10.3, 21.1 0.49 | 0.24 |
| Comp. Ex. 14 | 8.1 | — | — | 18.3, 26.2 0.70 | — |
| Comp. Ex. 15 | 10.0 | — | B 5.7 | 15.3, 26.0 0.60 | — |
| Comp. Ex. 16 | 8.0 | Nd 2.0 | — | 15.4, 22.6 0.68 | — |
| Comp. Ex. 17 | 7.0 | Nd 6.1 | — | 3.3, 21.0 0.16 | — |
| Comp. Ex. 18 | 7.0 | Nd 19.5 | — | 4.5, 21.0 0.21 | — |

TABLE 11

| | Reduction treatment | | Properties of magnetic iron based alley particles | | | |
|---|---|---|---|---|---|---|
| | Temperature (° C.) | Hydrogen flow rate (l/min) | Average major axis diameter (μm) | Aspect ratio | BET specific surface area (m²/g) | X-ray crystalline diameter $D_{110}$ (nm) |
| Ex. 31 | 500 | 35 | 0.19 | 11 | 40.0 | 15.5 |
| Ex. 32 | 500 | 35 | 0.19 | 11 | 50.8 | 15.2 |
| Ex. 33 | 450 | 35 | 0.14 | 9.5 | 52.6 | 12.5 |
| Ex. 34 | 450 | 35 | 0.14 | 9.5 | 50.1 | 13.1 |
| Ex. 35 | 500 | 35 | 0.10 | 9.1 | 54.0 | 15.9 |
| Ex. 36 | 500 | 35 | 0.09 | 9.0 | 60.0 | 14.7 |
| Ex. 37 | 450 | 35 | 0.14 | 9.5 | 55.3 | 12.5 |
| Comp. Ex. 19 | 500 | 35 | 0.17 | 9.5 | 46.3 | 16.8 |
| Comp. Ex. 20 | 500 | 35 | 0.18 | 10.0 | 50.6 | 15.0 |
| Comp. Ex. 21 | 450 | 35 | 0.13 | 7.8 | 36.4 | 14.9 |
| Comp. Ex 22 | 500 | 35 | 0.09 | 8.9 | 59.2 | 16.5 |
| Comp. Ex. 23 | 500 | 35 | 0.10 | 8.5 | 67.2 | 13.9 |

TABLE 11-continued

Properties of magnetic iron based alley particles

| | Co content Co/total Fe (atom %) | Al content Al/total Fe (atom %) | Rare earth element content Ln/total Fe (atom %) | Other element content Me/total Fe (atm %) | Coercive force (Oe) | Saturation manetization (emu/g) | Particle size distribution |
|---|---|---|---|---|---|---|---|
| Ex. 31 | 3.9 | 5.9 | Nd 1.5 | — | 1680 | 150.7 | 0.28 |
| Ex. 32 | 3.9 | 10.1 | Nd 1.5 | — | 1560 | 147.2 | 0.28 |
| Ex. 33 | 6.0 | 8.0 | Nd 4.0 | — | 1830 | 135.0 | 0.26 |
| Ex. 34 | 5.9 | 7.9 | Nd 2.1 | — | 1870 | 139.1 | 0.25 |
| Ex. 35 | 10.2 | 7.1 | Nd 6.0 | — | 1940 | 147.4 | 0.23 |
| Ex. 36 | 10.0 | 7.0 | Nd 12.0 | — | 1930 | 131.3 | 0.23 |
| Ex. 37 | 5.9 | 8.0 | Y 4.0 | — | 1830 | 135.4 | 0.25 |
| Comp. Ex. 19 | 4.1 | 8.0 | — | — | 1470 | 153.7 | — |
| Comp. Ex. 20 | 4.0 | 10.0 | — | B 5.7 | 1580 | 148.5 | — |
| Comp. Ex. 21 | 6.0 | 8.0 | Nd 2.0 | — | 1720 | 145.3 | — |
| Comp. Ex. 22 | 10.1 | 7.0 | Nd 6.1 | — | 1850 | 142.1 | — |
| Comp. Ex. 23 | 10.1 | 7.0 | Nd 19.5 | — | 1920 | 108.2 | — |

| | Properties of magnetic iron based alley particles | Sheet properties | | |
|---|---|---|---|---|
| | Squareness σr/σs | Coercive force (Oe) | Squareness Br/Bm | SFD |
| Ex. 31 | 0.526 | 1600 | 0.850 | 0.468 |
| Ex. 32 | 0.506 | 1470 | 0.853 | 0.462 |
| Ex. 33 | 0.529 | 1820 | 0.862 | 0.422 |
| Ex. 34 | 0.530 | 1850 | 0.854 | 0.444 |
| Ex. 35 | 0.522 | 1930 | 0.872 | 0.419 |
| Ex. 36 | 0.520 | 1900 | 0.864 | 0.410 |
| Ex. 37 | 0.525 | 1820 | 0.840 | 0.431 |
| Comp. Ex. 19 | 0.481 | 1330 | 0.776 | 0.651 |
| Comp. Ex. 20 | 0.494 | 1460 | 0.836 | 0.554 |
| Comp. Ex. 21 | 0.476 | 1720 | 0.743 | 0.688 |
| Comp. Ex. 22 | 0.503 | 1820 | 0.822 | 0.557 |
| Comp. Ex. 23 | 0.518 | 1900 | 0.851 | 0.410 |

TABLE 12

Production of spindle-shaped goethite seed particles
Mixed aqueous alkali solution

| | Aqueous alkali carbonate solution | | | Aqueous alkali hydroxide solution | | | Alkali ratio NaOH/total alkali (mol %) |
|---|---|---|---|---|---|---|---|
| | Kind | Concentration (mol/l) | Amount used (l) | Kind | Concentration (mol/l) | Amount used (l) | |
| Ex. 41 | Na$_2$CO$_3$ | 6.5 | 3.7 | NaOH | 0.374 | 32 | 33.3 |
| Ex. 42 | Na$_2$CO$_3$ | 6.5 | 3.7 | NaOH | 0.50 | 32 | 40.0 |
| Ex. 43 | Na$_2$CO$_3$ | 6.5 | 3.7 | NaOH | 0.374 | 32 | 33.3 |
| Ex. 44 | Na$_2$CO$_3$ | 6.5 | 3.7 | NaOH | 0.374 | 32 | 33.3 |
| Ex. 45 | Na$_2$CO$_3$ | 6.5 | 3.7 | NaOH | 0.374 | 32 | 33.3 |
| Ex. 46 | Na$_2$CO$_3$ | 6.5 | 3.7 | NaOH | 0.374 | 32 | 33.3 |

Production of spindle-shaped goethite seed particles

| | Aqueous ferrous salt solution | | | Equivalent ratio (total alkali/Fe$^{+2}$) | Aging | | |
|---|---|---|---|---|---|---|---|
| | Kind | Concentration (mol/l) | Amount used (l) | | Atmosphere | Temperature (°C.) | Time (hr) |
| Ex. 41 | FeSO$_4$ | 1.5 | 13.3 | 1.5 | N$_2$ | 47 | 5 |
| Ex. 42 | FeSO$_4$ | 1.5 | 13.3 | 1.6 | N$_2$ | 47 | 5 |
| Ex. 43 | FeSO$_4$ | 1.5 | 13.3 | 1.5 | N$_2$ | 47 | 5 |

TABLE 12-continued

| | | | | | | | |
|---|---|---|---|---|---|---|---|
| Ex. 43 | FeSO$_4$ | 1.5 | 13.3 | 1.5 | N$_2$ | 50 | 5 |
| Ex. 44 | FeSO$_4$ | 1.5 | 13.3 | 1.5 | N$_2$ | 47 | 5 |
| Ex. 45 | FeSO$_4$ | 1.5 | 13.3 | 1.5 | N$_2$ | 47 | 5 |
| Ex. 46 | FeSO$_4$ | 1.5 | 13.3 | 1.5 | N$_2$ | 47 | 5 |

Production of spindle-shaped goethite seed particles

Cobalt compound

| | Kind | Amount added (Co/Fe in seed crystal reaction) (atom %) | Adding time after the beginning of aging (min) | Temperature (° C.) | pH | Rate of aeration (l/min) |
|---|---|---|---|---|---|---|
| Ex. 41 | CoSO$_4$ | 5.5 (3.67)* | 100 | 47 | 9.5 | 70 |
| Ex. 42 | CoSO$_4$ | 5.5 (3.67)* | 110 | 47 | 9.5 | 70 |
| Ex. 43 | CoSO$_4$ | 5.5 (3.67)* | 130 | 47 | 9.5 | 70 |
| Ex. 44 | CoSO$_4$ | 9.0 (4.5)* | 110 | 50 | 9.5 | 70 |
| Ex. 45 | CoSO$_4$ | 9.0 (6.0)* | 180 | 47 | 9.5 | 70 |
| Ex. 46 | CoSO$_4$ | 12.0 (8.0)* | 240 | 47 | 9.5 | 70 |

*Co/total Fe in the seed production reaction and growth reaction (atm %)

TABLE 13

Properties of goethite seed particles

| | Kind | Shape | Average major axis diameter (μm) | Aspect ratio | BET specific surface area (m$^2$/g) | Co Content (Co/total Fe in seed particle) (atom %) |
|---|---|---|---|---|---|---|
| Ex. 41 | Goethite particle | Spindle | 0.32 | 13.5 | 75.6 | 5.6 |
| Ex. 42 | Goethite particle | Spindle | 0.32 | 13.6 | 77.5 | 5.5 |
| Ex. 43 | Goethite particle | Spindle | 0.30 | 12.1 | 82.6 | 5.5 |
| Ex. 44 | Goethite particle | Spindle | 0.25 | 12.5 | 90.1 | 9.0 |
| Ex. 45 | Goethite particle | Spindle | 0.21 | 10.6 | 105.3 | 8.9 |
| Ex. 46 | Goethite particle | Spindle | 0.16 | 10.0 | 145.1 | 11.9 |

TABLE 14

Growth reaction of spindle-shaped goethite seed particles
Mixed aqueous alkali solution

| | Aqueous alkali carbonate solution | | | Aqueous alkali hydroxide solution | | | Alkali ratio NaOH/ total alkali (mol %) | Aqueous ferrous salt solution | | | Total Fe ratio (mol %) | Equivalent ratio (total alkali/ Fe$^{+2}$) |
|---|---|---|---|---|---|---|---|---|---|---|---|---|
| | Kind | Concentration (mol/l) | Amount used (l) | Kind | Concentration (mol/l) | Amount used (l) | | Kind | Concentration (mol/l) | Amount used (l) | | |
| Ex. 41 | Na$_2$CO$_3$ | 6.5 | 1.85 | NaOH | 3 | 2 | 33.3 | FeSO$_4$ | 1.5 | 6.66 | 33.3 | 1.5 |
| Ex. 42 | Na$_2$CO$_3$ | 6.5 | 1.85 | NaOH | 3 | 2.67 | 40.0 | FeSO$_4$ | 1.5 | 6.66 | 33.3 | 1.6 |
| Ex. 43 | Na$_2$CO$_3$ | 6.5 | 1.85 | NaOH | 3 | 2 | 33.3 | FeSO$_4$ | 1.5 | 6.66 | 33.3 | 1.5 |
| Ex. 44 | Na$_2$CO$_3$ | 6.5 | 3.7 | NaOH | 3 | 2 | 33.3 | FeSO$_4$ | 1.5 | 13.3 | 50.0 | 1.5 |
| Ex. 45 | Na$_2$CO$_3$ | 6.5 | 1.85 | NaOH | 3 | 2 | 33.3 | FeSO$_4$ | 1.5 | 6.66 | 33.3 | 1.5 |
| Ex. 46 | Na$_2$CO$_3$ | 6.5 | 1.85 | NaOH | 3 | 2 | 33.3 | FeSO$_4$ | 1.5 | 6.66 | 33.3 | 1.5 |

Growth reaction of spindle-shaped goethite seed particles

| | Aluminum compound | | Presence or absence of Co ion at addition | Rare earth compound | | Timing of addition* | Temperature (° C.) | pH | Rate of aeration (l/min) |
|---|---|---|---|---|---|---|---|---|---|
| | Kind | Amount added (Al/total Fe) | | Kind | Amount added (Ln/total Fe) (atom %) | | | | |
| Ex. 41 | Sodium aluminate | 5.0 | Absence | Neodymium nitrate | 1.5 | A | 47 | 9.5 | 150 |
| Ex. 42 | Sodium aluminate | 5.0 | Absence | Neodymium nitrate | 1.5 | A | 47 | 9.5 | 150 |
| Ex. 43 | Aluminum sulfate | 6.0 | Absence | Neodymium nitrate | 3.0 | A | 47 | 9.5 | 150 |
| Ex. 44 | Sodium aluminate | 6.0 | Absence | Neodymium nitrate | 3.0 | B | 50 | 9.5 | 150 |

TABLE 14-continued

| | | | | | | | | | |
|---|---|---|---|---|---|---|---|---|---|
| Ex. 45 | Sodium aluminate | 7.0 | Absence | Neodymium nitrate | 4.0 | B | 47 | 9.5 | 150 |
| Ex. 46 | Aluminum sulfate | 6.0 | Absence | Neodymium nitrate | 6.0 | C | 47 | 9.5 | 150 |

*)Timing of the addition of aluminum compound and compound of rare earth element.
A: Adding to aqueous suspension after the production of goethite seed particles
B: Adding to mixed alkali solution in the growing reaction
C: Adding to aqueous ferrous salt solution in the seed particles

TABLE 15

| | | | Properties of goethite particles | | | | | |
|---|---|---|---|---|---|---|---|---|
| | Kind | Shape | Average major axis diameter (μm) | Aspect ratio | BET specific surface area (m²/g) | Co content (Co/Fe) (atom %) | Al content (Al/Fe) (atom %) | Rare earth element content (Ln/total Fe) (atom %) | Particle size distribution |
| Ex. 41 | Goethite particle | Spindle | 0.33 | 13.8 | 101.7 | 3.6 | 5.0 | 1.6 | 0.22 |
| Ex. 42 | Goethite particle | Spindle | 0.32 | 13.9 | 100.3 | 3.7 | 5.1 | 1.5 | 0.22 |
| Ex. 43 | Goethite particle | Spindle | 0.30 | 12.0 | 108.6 | 3.6 | 5.9 | 2.9 | 0.22 |
| Ex. 44 | Goethite particle | Spindle | 0.25 | 12.8 | 124.6 | 4.6 | 5.9 | 3.1 | 0.20 |
| Ex. 45 | Goethite particle | Spindle | 0.22 | 11.2 | 133.4 | 6.0 | 7.0 | 4.0 | 0.17 |
| Ex. 46 | Goethite particle | Spindle | 0.17 | 10.3 | 161.2 | 8.1 | 5.9 | 6.1 | 0.16 |

TABLE 16

Production of hematite particles

| | Anti-sintering agent | | | | Heat treatment | |
|---|---|---|---|---|---|---|
| | Rare earth compound (Ln) | | Aluminum compound (Al) | | | |
| | Kind | Amount added Ln/Fe (atm %) | Kind | Amount added Al/Fe (atm %) | Temperature (°C.) | Atmosphere |
| Ex. 47 | Neodymium nitrate | 1.0 | — | — | 790 | Air |
| Ex. 48 | — | — | Aluminum nitrate | 4.0 | 790 | Air |
| Ex. 49 | — | — | — | — | 770 | Air |
| Ex. 50 | — | — | Aluminum nitrate | 3.0 | 750 | Air |
| Ex. 51 | Neodymium nitrate | 2.5 | Aluminum nitrate | 3.0 | 730 | Air |
| Ex. 52 | Neodymium nitrate | 6.0 | Aluminum nitrate | 3.0 | 700 | Air |

Properties of hematite particles

| | Kind | Shape | Average major axis diameter (μm) | Aspect ratio | BET specific surface area (m²/g) | Co content (Co/total Fe in seed particle) (atom %) |
|---|---|---|---|---|---|---|
| Ex. 47 | Hematite particles | Spindle | 0.30 | 13.0 | 34.1 | 3.6 |
| Ex. 48 | Hematite particles | Spindle | 0.30 | 13.0 | 39.3 | 3.6 |
| Ex. 49 | Hematite particles | Spindle | 0.28 | 11.3 | 35.2 | 3.5 |
| Ex. 50 | Hematite particles | Spindle | 0.22 | 12.0 | 40.3 | 4.5 |
| Ex. 51 | Hematite particles | Spindle | 0.20 | 10.5 | 61.3 | 6.0 |
| Ex. 52 | Hematite particles | Spindle | 0.15 | 10.0 | 70.6 | 8.1 |

Properties of hematite particles

| | Al content Al/Fe (atom %) | Rare earth element content Ln/Fe (atom %) | X-ray crystalline diameter $D_{104}$, $D_{110}$ (nm) (nm) $D_{104}/D_{110}$ | Particle size distribution |
|---|---|---|---|---|
| Ex. 47 | 5.1 | 2.5 | 147, 270 0.54 | 0.26 |
| Ex. 48 | 9.1 | 1.6 | 152, 276 0.55 | 0.26 |
| Ex. 49 | 5.9 | 3.0 | 144, 280 0.54 | 0.26 |
| Ex. 50 | 8.9 | 3.0 | 125, 240 0.52 | 0.24 |
| Ex. 51 | 10.0 | 6.4 | 84, 210 0.40 | 0.21 |
| Ex. 52 | 9.0 | 11.8 | 45, 205 0.22 | 0.20 |

TABLE 17

| | Reduction treatment | | Properties of magnetic iron based alley particles | | | |
|---|---|---|---|---|---|---|
| | Temperature (° C.) | Hydrogen flow rate (l/min) | Average major axis diameter (μm) | Aspect ratio | BET specific surface area (m²/g) | X-ray crystalline diameter $D_{110}$ |
| Ex. 53 | 500 | 35 | 0.19 | 11.0 | 39.2 | 15.8 |
| Ex. 54 | 500 | 35 | 0.19 | 10.5 | 44.4 | 16.3 |
| Ex. 55 | 500 | 35 | 0.17 | 10.0 | 51.3 | 18.6 |
| Ex. 56 | 500 | 35 | 0.14 | 9.5 | 51.8 | 16.2 |
| Ex. 57 | 450 | 35 | 0.11 | 9.0 | 59.7 | 12.4 |
| Ex. 58 | 450 | 35 | 0.09 | 9.0 | 61.4 | 11.9 |

| | Properties of magnetic iron based alley particles | | | | | |
|---|---|---|---|---|---|---|
| | Co content Co/total Fe (atom %) | Al content Al/total Fe (atom %) | Bare earth element content Ln/total Fe (atom %) | Coercive force (Oe) | Saturation magnetization (emu/g) | Particle size distribution |
| Ex. 53 | 3.7 | 5.0 | 2.5 | 1690 | 155.5 | 0.27 |
| Ex. 54 | 3.5 | 9.0 | 1.5 | 1580 | 153.7 | 0.27 |
| Ex. 55 | 3.4 | 5.9 | 2.9 | 1750 | 154.2 | 0.27 |
| Ex. 56 | 4.4 | 9.0 | 3.0 | 1830 | 152.3 | 0.25 |
| Ex. 57 | 6.0 | 10.1 | 6.5 | 1930 | 145.3 | 0.22 |
| Ex. 58 | 8.0 | 8.9 | 11.9 | 1950 | 130.0 | 0.22 |

| | Properties of magnetic iron based alley particles | Sheet properties | | |
|---|---|---|---|---|
| | Squareness σr/σs | Coercive force (Oe) | Squareness Br/Bm | SFD |
| Ex. 53 | 0.505 | 1620 | 0.864 | 0.442 |
| Ex. 54 | 0.501 | 1500 | 0.858 | 0.452 |
| Ex. 55 | 0.506 | 1700 | 0.865 | 0.436 |
| Ex. 56 | 0.512 | 1800 | 0.860 | 0.440 |
| Ex. 57 | 0.517 | 1910 | 0.876 | 0.405 |
| Ex. 58 | 0.520 | 1940 | 0.880 | 0.400 |

What is claimed is:

1. Spindle-shaped hematite particles having an average major axial diameter of 0.05 to 1.0 μm, an aspect ratio (major axial diameter/minor axial diameter) of 10 to 15 and a ratio $D_{104}/D_{110}$ of an X-ray crystallite size of 0.20 to 0.65.

2. Spindle-shaped hematite particles according to claim 1, which have a BET specific surface area of 30 to 140 m²/g.

3. Spindle-shaped hematite particles according to claim 1, wherein the amount of the hematite seed is 50 to 80 wt % based on the weight of the spindle-shaped hematite particles.

4. Spindle-shaped hematite particles having an average major axial diameter of 0.05 to 1.0 μm and an aspect ratio (major axial diameter/minor axial diameter) of 10 to 15; and comprising:
   a hematite seed containing 0.5 to 25 atm % of Co based on the total Fe in the spindle-shaped hematite particles, and
   a hematite surface layer containing 0.5 to 15 atm % of Al based on the total Fe in the spindle-shaped hematite particles.

5. Spindle-shaped hematite particles according to claim 4, which further have an upper surface layer comprising a rare earth element of 0.5 to 15 atm %, calculated as the rare earth element, based on the total Fe in the spindle-shaped hematite particles, on the hematite surface layer.

6. Spindle-shaped hematite particles according to claim 4, wherein the hematite surface layer contains 0.5 to 10 atm % of a rare earth element based on the total Fe in the spindle-shaped hematite particles.

7. Spindle-shaped hematite particles according to claim 4, which have a ratio $D_{104}/D_{110}$ of an X-ray crystallite size of 0.20 to 0.65.

8. Spindle-shaped hematite particles according to claim 4, which have a BET specific surface area of 30 to 140 m²/g.

9. Spindle-shaped hematite particles according to claim 4, the amount of the hematite surface layer is 20 to 50 wt % based on the weight of the spindle-shaped hematite particles.

10. Spindle-shaped hematite particles comprising:
   a hematite seed containing 0.5 to 25 atm % of Co based on the total Fe in the spindle-shaped hematite particles,
   a hematite surface layer containing 0.5 to 15 atm % of Al based on the total Fe in the spindle-shaped hematite particles, and
   an upper surface layer comprising a rare earth element of 0.5 to 15 atm %, calculated as the rare earth element, based on the total Fe in the spindle-shaped hematite particles; and
   having an average major axial diameter of 0.05 to 1.0 μm, an aspect ratio (major axial diameter/minor axial diameter) of 10 to 15 and a ratio $D_{104}/D_{110}$ of an X-ray crystallite size of 0.20 to 0.65.

11. Spindle-shaped hematite particles comprising:
   a hematite seed containing 0.5 to 25 atm % of Co based on the total Fe in the spindle-shaped hematite particles, and
   a hematite surface layer containing 0.5 to 10 atm % of Al based on the total Fe in the spindle-shaped hematite particles and 0.5 to 15 atm % of a rare earth element based on the total Fe in the spindle-shaped hematite particles; and
   having an average major axial diameter of 0.05 to 1.0 μm, an aspect ratio (major axial diameter/minor axial diameter) of 10 to 15 and a ratio $D_{104}/D_{110}$ of an X-ray crystallite size of 0.20 to 0.65.

12. A process for producing spindle-shaped hematite particles having an average major axial diameter of 0.05 to 1.0 μm and an aspect ratio (major axial diameter/minor axial diameter) of 10 to 15 said particles comprising a hematite seed containing 0.5 to 25 atm % of Co based on the total Fe in the spindle-shaped hematite particles, and a hematite surface layer containing 0.5 to 15 atm % of Al based on the total Fe in the spindle-shaped hematite particles, said process comprising the steps of:
   aging an aqueous suspension containing a precipitate comprising ferrous obtained by reacting a mixed aqueous alkali solution of an aqueous alkali carbonate solution and an aqueous alkali hydroxide solution with a ferrous salt solution, in a non-oxidizing atmosphere;
   introducing an oxygen-containing gas into said aqueous suspension to produce spindle-shaped goethite seed particles;
   adding a ferrous salt solution, and a mixed aqueous alkali solution of an aqueous alkali carbonate solution and an aqueous alkali hydroxide solution to said aqueous suspension containing said seed particles;

introducing an oxygen-containing gas into said aqueous suspension to grow goethite on the particle surfaces of said spindle-shaped goethite seed particles;

adding a compound of a rare earth element in which the content of the rare earth element is 0.5 to 15 atm %, calculated as said rare earth element, based on the total Fe spindle-shaped hematite particles as an anti-sintering for treating the surfaces of said spindle-shaped goethite particles; and dehydrating said spindle-shaped goethite particles at a temperature of 400 to 850° C. to obtain spindle-shaped hematite particles;

wherein in the process of producing said seed particles, a cobalt compound in which the Co content is 0.5 to 25 atm %, calculated as Co, based on the total Fe in the spindle-shaped hematite particles is added to one selected from the group consisting of said ferrous salt solution, said aqueous suspension containing said precipitate comprising ferrous, said aqueous suspension containing said precipitate comprising ferrous in the course of aging and before the beginning of the oxidization reaction, and said aqueous suspension in the course of producing said goethite seed particles; and in the process of growing said goethite, an aluminum compound in which the Al content is 0.5 to 15 atm %, calculated as Al, based on the total Fe in the spindle-shaped hematite particles is added to one of the alkali solutions selected from the group consisting of said ferrous salt solution, said aqueous suspension containing said spindle-shaped seed particles and said precipitate comprising ferrous, before the beginning of said oxidization reaction, and said aqueous suspension in the course of growing said goethite.

13. A process For producing spindle-shaped hematite particles according to claim 12, wherein, in said process of growing said goethite, a compound of a rare earth element in which the content of the rare earth element is 0.5 to 10 atm %, calculated as said rare earth element, based on the total Fe in the spindle-shaped goethite particles is further added to one selected from the group consisting of said aqueous alkali solutions added, said ferrous salt solution, said aqueous suspension containing said spindle-shaped seed particles and said precipitate comprising ferrous before the beginning of said oxidization reaction, and said aqueous suspension in the course of growing said goethite.

* * * * *